US009954643B2

(12) United States Patent
El-Khamy et al.

(10) Patent No.: US 9,954,643 B2
(45) Date of Patent: Apr. 24, 2018

(54) COMMUNICATION SYSTEM WITH REPEAT-RESPONSE COMBINING MECHANISM AND METHOD OF OPERATION THEREOF

(71) Applicant: Samsung Electronics Co., Ltd., Gyeonggi-Do (KR)

(72) Inventors: Mostafa El-Khamy, San Diego, CA (US); Jungwon Lee, San Diego, CA (US); Inyup Kang, San Diego, CA (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 365 days.

(21) Appl. No.: 13/908,765

(22) Filed: Jun. 3, 2013

(65) Prior Publication Data
US 2013/0343271 A1 Dec. 26, 2013

Related U.S. Application Data

(60) Provisional application No. 61/663,459, filed on Jun. 22, 2012, provisional application No. 61/663,465, (Continued)

(51) Int. Cl.
H04L 1/00 (2006.01)
H04L 1/18 (2006.01)

(52) U.S. Cl.
CPC .......... H04L 1/004 (2013.01); H04L 1/1845 (2013.01)

(58) Field of Classification Search
CPC .................. H04L 1/004; H04L 1/1845
See application file for complete search history.

(56) References Cited

U.S. PATENT DOCUMENTS 5,668,820 A * 9/1997 Ramesh et al. ............... 714/786
5,715,257 A * 2/1998 Matsuki ................ H04L 1/1664
714/748
(Continued)

FOREIGN PATENT DOCUMENTS

KR 10-2010-0029520 A 3/2010

OTHER PUBLICATIONS

Brayer, K., "Error Control Techniques Using Binary Symbol Burst Codes", Communication Technology, IEEE Transactions, vol. 16, No. 2, pp. 199-214, Apr. 1968.
(Continued)

Primary Examiner — Alex Skripnikov
Assistant Examiner — Wilfred Thomas
(74) Attorney, Agent, or Firm — Perspectives Law Group

(57) ABSTRACT

A communication system includes: a validation module configured to transmit a repeat request corresponding to a preceding data including a communication content; an inter-block processing module, coupled to the validation module, configured to determine a previous communication value based on the preceding data; a detection module, coupled to the inter-block processing module, configured to identify a repeat data corresponding to the repeat request from a receiver signal; an accumulator module, coupled to the detection module, configured to generate an accumulation output based on the preceding data and the repeat data; and a decoding module, coupled to the accumulator module, configured to determine the communication content using the previous communication value and the accumulation output across instances of transmission blocks for communicating with a device.

20 Claims, 7 Drawing Sheets

Related U.S. Application Data filed on Jun. 22, 2012, provisional application No. 61/752,285, filed on Jan. 14, 2013.

(56) References Cited

U.S. PATENT DOCUMENTS

| | | | |
|---|---|---|---|
| 6,317,418 B1 | 11/2001 | Raitola et al. | |
| 6,418,549 B1* | 7/2002 | Ramchandran et al. | 714/811 |
| 6,591,390 B1* | 7/2003 | Yagyu | H03M 13/09 |
| | | | 714/755 |
| 2003/0014709 A1* | 1/2003 | Miyoshi et al. | H04L 1/0066 |
| | | | 714/758 |
| 2003/0053435 A1* | 3/2003 | Sindhushayana et al. | 370/342 |
| 2004/0037245 A1* | 2/2004 | Grilli et al. | 370/331 |
| 2005/0105191 A1 | 5/2005 | Baer et al. | |
| 2005/0152314 A1* | 7/2005 | Sun et al. | 370/334 |
| 2005/0207406 A1 | 9/2005 | Reme | |
| 2006/0153155 A1 | 7/2006 | Jacobsen et al. | |
| 2006/0156163 A1* | 7/2006 | Berens | H04L 1/005 |
| | | | 714/748 |
| 2007/0157069 A1* | 7/2007 | Lyakh et al. | 714/791 |
| 2008/0233966 A1* | 9/2008 | Scheim et al. | 455/452.1 |
| 2009/0128377 A1* | 5/2009 | Tran | 341/50 |
| 2009/0286496 A1* | 11/2009 | Yavuz et al. | 455/127.1 |
| 2010/0017674 A1* | 1/2010 | Mo et al. | 714/749 |
| 2010/0202572 A1 | 8/2010 | Bae et al. | |
| 2011/0041023 A1* | 2/2011 | Shimezawa et al. | 714/748 |
| 2011/0099446 A1* | 4/2011 | Murakami | 714/748 |
| 2011/0126072 A1* | 5/2011 | Yoshimoto et al. | 714/751 |
| 2012/0014361 A1* | 1/2012 | Jung et al. | 370/338 |
| 2012/0087396 A1* | 4/2012 | Nimbalker et al. | 375/219 |
| 2012/0320853 A1* | 12/2012 | Kwon et al. | 370/329 |

OTHER PUBLICATIONS

Chase, D., "Coding Combining—A maximum likelihood decoding approach for combining an arbitrary number of noisy packets," IEEE Transactions on Communications, vol. 33, pp. 385-393, May 1985.

Narayanan, K. R. and Stuber, G.L., "A novel ARQ technique using the turbo coding principle", Communications Letters, IEEE, vol. 1, No. 2, pp. 49-51, Mar. 1997.

Yeung, C.K.A., Lee, J., and Kim, S., "A simple slicer for soft detection in Gray-coded QAM-modulated MIMO OFDM systems," in Sarnoff Symposium (SARNOFF), 2012 35th IEEE, May 2012, pp. 1-5.

Jang, E. et al., "On the combining schemes for MIMO systems with hybrid ARQ," Wireless Communications, IEEE Transactions on, vol. 8, No. 2, pp. 836-842, Feb. 2009.

Jang, E. et al.,"An efficient symbol-level combining scheme for MIMO systems with hybrid ARQ," Wireless Communications, IEEE Transactions on, vol. 8, No. 5, pp. 2443-2451, 2009.

Holland, I. et al., "Soft combining for hybrid ARQ," Electronics Letters, vol. 41, No. 22, pp. 1230-1231, Oct. 2005.

El-Khamy, M. et al., "Soft Turbo HARQ Combining", IEEE ICC 2013—Wireless Communications Symposium (ICC'13 WCS), Budapest, Hungary, Jun. 2013, pp. 4135-4140.

* cited by examiner

COMMUNICATION SYSTEM WITH REPEAT-RESPONSE COMBINING MECHANISM AND METHOD OF OPERATION THEREOF

CROSS-REFERENCE TO RELATED APPLICATION(S)

This application claims the benefit of U.S. Provisional Patent Application Ser. Nos. 61/663,459 filed Jun. 22, 2012, 61/663,465 filed Jun. 22, 2012, and 61/752,285 filed Jan. 14, 2013, and the subject matter thereof is incorporated herein by reference thereto.

TECHNICAL FIELD

An embodiment of the present invention relates generally to a communication system, and more particularly to a system with repeat-response combining mechanism.

BACKGROUND

Modern consumer and industrial electronics, especially devices such as cellular phones, navigations systems, portable digital assistants, and combination devices, are providing increasing levels of functionality to support modern life including mobile communication. Research and development in the existing technologies can take a myriad of different directions.

The increasing demand for information in modern life requires users to access information at any time, at increasing data rates. However, telecommunication signals used in mobile communication effectively experience various types of interferences from numerous sources, as well as computational complexities rising from numerous possible formats for communicated information, which affect the quality and speed of the accessible data.

Thus, a need still remains for a communication system with repeat-response combining mechanism. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides a communication system, including: a validation module configured to transmit a repeat request corresponding to a preceding data including a communication content; an inter-block processing module, coupled to the validation module, configured to determine a previous communication value based on the preceding data; a detection module, coupled to the inter-block processing module, configured to identify a repeat data corresponding to the repeat request from a receiver signal; an accumulator module, coupled to the detection module, configured to generate an accumulation output based on the preceding data and the repeat data; and a decoding module, coupled to the accumulator module, configured to determine the communication content using the previous communication value and the accumulation output across instances of a transmission block for communicating with a device.

An embodiment of the present invention provides a method of operation of a communication system including: transmitting a repeat request corresponding to a preceding data including a communication content; determining a previous communication value with a control unit based on the preceding data; identifying a repeat data corresponding to the repeat request from a receiver signal; generating an accumulation output based on the preceding data and the repeat data; and determining the communication content using the previous communication value and the accumulation output across instances of a transmission block for communicating with a device.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
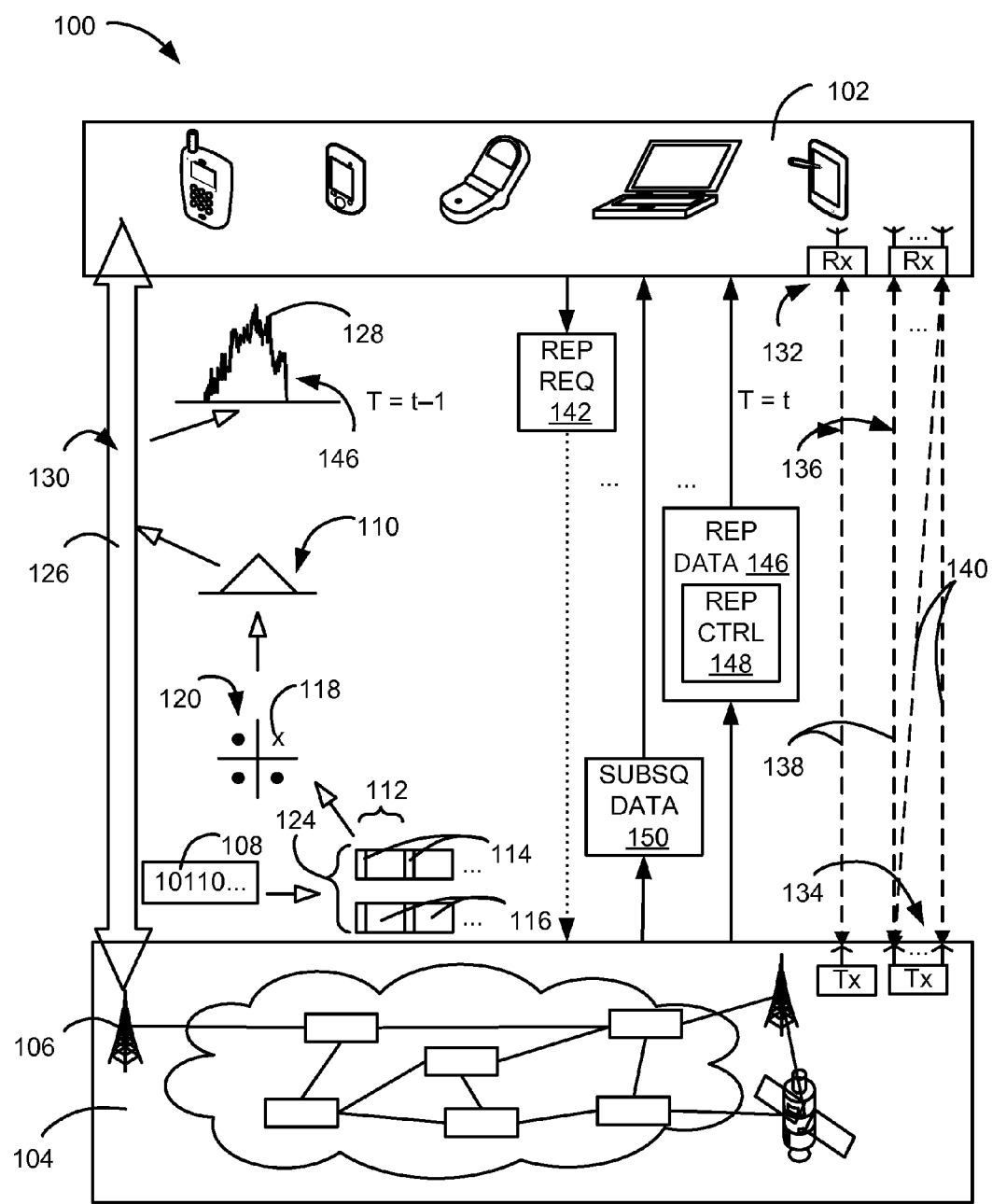
FIG. 1 is a communication system with repeat-response combining mechanism in an embodiment of the present invention.

The following embodiments of the present invention can be used to combine a preceding data with a repeat data communicated in response to a repeat request corresponding to the preceding data. Processing results for the preceding data, such as a previous communication value, including a previous inner-decoder value and a previous overall-decoding value, a puncturing output based on a decoding a-priori value or the previous communication value, the preceding data, or a combination thereof, can be used for processing the repeat data. Further, the processing results can be implemented according to a turbo-principle mechanism for various combinations of processes across instances of transmission blocks.

A feedback profile for using the processing results for the preceding data in processing the repeat data provides increase in communication speed, reduction of decoding cycles, lower power consumption, lower retransmission requests, and lower error rates. Also, the previous communication value, the puncturing output, the feedback profile, or a combination thereof provide other unexpected gain in throughput and coding.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments have been numbered first embodiment, second embodiment, etc. as a matter of descriptive convenience and are not intended to have any other significance or provide limitations for an embodiment of the present invention.

The term "module" referred to herein can include software, hardware, or a combination thereof in an embodiment of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

The term "processing" as used herein includes filtering signals, decoding symbols, assembling data structures, transferring data structures, manipulating data structures, and reading and writing data structures. Data structures are defined to be information arranged as symbols, packets, blocks, files, input data, system generated data, such as calculated or generated data, and program data.

Referring now to FIG. 1, therein is shown a communication system 100 with repeat-response combining mechanism in an embodiment of the present invention. The communication system 100 includes a mobile device 102, such as a cellular phone or a notebook computer, connected to a network 104. The network 104 is a system of wired or wireless communication devices that are connected to each other for enabling communication between devices.

For example, the network 104 can include a combination of wires, transmitters, receivers, antennas, towers, stations, repeaters, telephone network, servers, or client devices for a wireless cellular network. The network 104 can also include a combination of routers, cables, computers, servers, and client devices for various sized area networks.

The network 104 can include a base station 106 for directly linking and communicating with the mobile device 102. The base station 106 can receive wireless signals from the mobile device 102, transmit signals to the mobile device 102, process signals, or a combination thereof. The base station 106 can also relay signals between other base stations, components within the network 104, or a combination thereof.

The mobile device 102 can be connected to the network 104 through the base station 106. For example, the base station 106 can include or be with a cell tower, a wireless router, an antenna, a processing device, or a combination thereof being used to send signals to or receive signals from the mobile device 102, such as a smart phone or a laptop computer.

The mobile device 102 can connect to and communicate with other devices, such as other mobile devices, servers, computers, telephones, or a combination thereof. For example, the mobile device 102 can communicate with other devices by transmitting signals, receiving signals, processing signals, or a combination thereof and displaying a content of the signals, audibly recreating sounds according to the content of the signals, processing according to the content, such as storing an application or updating an operating system, or a combination thereof.

The base station 106 can be used to wirelessly exchange signals for communication, including voice signals of a telephone call or data representing a webpage and interactions therewith. The base station 106 can also transmit reference signals, training signals, error detection signals, error correction signals, header information, transmission format, protocol information, or a combination thereof.

Based on the communication method, such as code division multiple access (CDMA), orthogonal frequency-division multiple access (OFDMA), Third Generation Partnership Project (3GPP), Long Term Evolution (LTE), or fourth generation (4G) standards, the communication signals can include a reference portion, a header portion, a format portion, an error correction or detection portion, or a combination thereof imbedded in the communicated information. The reference portion, header portion, format portion, error correction or detection portion, or a combination thereof can include a predetermined bit, pulse, wave, symbol, or a combination thereof. The various portions can be embedded within the communicated signals at regular time intervals, frequency, code, or a combination thereof.

The base station 106 can communicate a communication content 108 by sending a transmitter signal 110 to the mobile device 102. The communication content 108 is data from a transmitting device intended for communication by reproduction or processing at a receiving device. For example, the communication content 108 can be a sequence of bits intended for displaying, audibly recreating, executing instructions, storing, or a combination thereof at a receiving device, such as the mobile station 102.

The base station 106 can modify the communication content 108 to generate and transmit the transmitter signal 110. The transmitter signal 110 is data actually transmitted by a device for communication and having a format for transmission. The base station 106 can generate the transmitter signal 110 by modifying, such as by interleaving or adding formatting information, the communication content 108 according to methods or standardizations predetermined by the communication system 100 to generate code words 112. The code words 112 are each units of information having a length predetermined by the communication system 100 for communicating information between devices.

For example, the transmitter signal 110 can be the code words 112 including a sequence of bits representing the communication content 108, an information portion 114 and a parity portion 116. The information portion 114 is the portion of the code words 112 corresponding to the communication content 108. The parity portion 116 is information additional to and based on the communication content 108 for error prevention, error detection, error correction, or a combination thereof. The communication system 100 can determine and add the parity portion 116 according to a method or standard predetermined by the communication system 100, a communication standard, or a combination thereof.

Also for example, the transmitter signal 110 can be a symbol 118 or a sequence thereof according to a modulation scheme 120, such as quadrature amplitude modulation (QAM) or phase-shift keying (PSK). The symbol 118 or the sequence thereof can correspond to the sequence of bits representing the communication content 108, the code words 112, or a combination thereof.

The transmitter signal 110 can include the code words 112 according to a transmission block 124. The transmission block 124 is a grouping of the code words 112 for transmitting between devices. For example, the transmission block 124 can be limitation on a quantity of the code words 112, a duration for transmission, a format for arrange information, or a combination thereof. The transmitter signal 110 can include one or more instances of the transmission block 124 grouping the code words 112 for representing the communication content 108.

The transmitter signal 110 can arrive at the mobile station 102 after traversing a transmitter channel 126. The transmitter channel 126 can be wireless, wired, or a combination thereof. The transmitter channel 126 can be a direct link between the mobile device 102 and the base station 106 or can include repeaters, amplifiers, or a combination thereof. For example, the transmitter channel 126 can include communication frequency, time slot, packet designation, transmission rate, channel code, or a combination thereof used for transmitting signals between the mobile device 102 and the base station 106.

The mobile station 102 can receive a receiver signal 128. The receiver signal 128 is information received by a device in the communication system 100. The receiver signal 128 can include the transmitter signal 110 that has been altered from traversing the transmitter channel 126. The receiver signal 128 can further include noise from the mobile device 102, the base station 106, or a combination thereof, interference signals from other devices and corresponding channel effects, or a combination thereof.

The communication system 100 can estimate a channel estimate 130 from the receiver signal 128. The channel estimate 130 is a description of changes to signals caused by the transmitter channel 126. The channel estimate 130 can describe and quantize reflection, loss, delay, refraction, obstructions, or a combination thereof a signal can experience while traversing between the base station 106 and the mobile device 102. The channel estimate 130 can be a matrix value characterizing the transmitter channel 126.

The communication system 100 can further have various configurations for communicating between devices. The communication system 100 can use a single-input single-output (SISO) scheme 132 or a multiple-input multiple-output (MIMO) scheme 134. The single-input single-output scheme 132 is an arrangement for wireless communication using one antenna on the transmitter and one antenna on the receiver.

The multiple-input multiple-output scheme 134 is an arrangement for wireless communication using more than one antenna on the transmitter, the receiver, or a combination thereof. For example, the base station 106 can use two antennas to transmit and the mobile device 102 can use one or two antenna to receive for a '2×1' or a '2×2' system.

The single-input single-output scheme 132 can include a communication layer 136 for communication. The communication layer 136 is a unique combination of antennas between the transmitter and the receiver. For example, the multiple-input multiple-output scheme 134 can include multiple instances of the communication layer 136 based on the number of antennas on the base station 106, the mobile device 102, or a combination thereof.

The transmitting device can transmit the transmitter signal 110 using available instances of the communication layer 136. For example, the base station 106 can transmit the transmitter signal 110 using one or more instances of the communication layer 136 corresponding to the available antennas.

As a more specific example, the base station 106 can transmit a base layer data 138 and a further layer data 140. The base layer data 138 and the further layer data 140 can each be a stream of information corresponding to exclusive or overlapping portions of the communication content 108. The base layer data 138 can be the transmitter signal 110 for the single-input single-output scheme 132. The transmitter signal 110 can include a combination of the base layer data 138 and the further layer data 140 for the multiple-input multiple-output scheme 134 using two antennas on the transmitting device.

For illustrative purposes, the communication system 100 is described as communicating by transmitting from the base station 106 and receiving at the mobile device 102. However, it is understood that the communication system 100 can also transmit from the mobile device 102, receive at the base station 106, or a combination thereof.

The communication system 100 can repeat communications based on processing the receiver signal 128. The mobile device 102 can send a repeat request 142 based on processing a preceding data 144. The repeat request 142 can be a message or a signal notifying a status of processing at the receiving device for repeating the transmission. The preceding data 144 can be the receiver signal 128 corresponding to the repeat request 142.

For example, the repeat request 142 can include an acknowledgement (ACK) of successful processing by the mobile device 102 sent to the base station 106. The base station 106 can send a repeat data 146 associated with the preceding data 144 corresponding to an absence of the ACK. Also for example, the repeat request 142 can include a negative-acknowledgement (NACK) corresponding to unsuccessful processing or error checking result by the mobile device 102 sent to the base station 106. The base station can send the repeat data 146 associated with the preceding data 144 corresponding to the repeat request 142.

The repeat data 146 can be information retransmitted based on the repeat request 142. The repeat data 146 can include all or a portion of the preceding data 144 corresponding to the repeat request 142.

For example, the communication system 100 can use a hybrid automatic repeat request (HARQ) mechanism for communicating between devices. The communication system 100 can include inaccuracies in the channel estimate 130 at the mobile device 102, inaccuracies due to time delay in feeding back information based on the channel estimate 130 to the base station 106, or a combination thereof for communication and repeating transmissions. Such inaccuracies can cause detection of errors in processing the receiver signal 128, such as through error detection processes, including cyclic redundancy check (CRC) using the parity portion 116.

Continuing with the example, the mobile device 102 can send the repeat request 142 based on the status of CRC. The base station 106 can transmit the repeat data 146 in a variety of ways. The communication system 100 can use a type-I HARQ with combining or chase combining (CC), a type-II HARQ or incremental redundancy (IR), or a type-III HARQ called hybrid CC/IR or partial IR.

Continuing with the example, the base station 106 can transmit the same symbols of the first transmission of a certain packet in the preceding data 144 in the repeat data 146 for the same packet for the type-I HARQ. The base station 106 can include one or more instances of the symbol 118 in the repeat data 146 that are different than those of previous transmissions of the same packet for the preceding data 144 and correspond to different partitions of the coded bits for the type-II HARQ. The initial transmission of the repeat data 146 can correspond to the information portion 114 of the preceding data 144 and the remaining transmissions can correspond to the parity portion 116 thereof.

Continuing with the example, the base station 106 can transmit the repeat data 146 based on four redundancy versions, each which determine the read location of coded bits arranged in a circular buffer, for the type-III HARQ. The subsequent transmissions of the same packet in the repeat data 146 corresponding to the preceding data 144 can constitute of both previously transmitted and newly coded symbols corresponding to the same information packet.

The repeat data 146 can include a repeat control 148. The repeat control 148 is an indication of formatting for the repeat data 146. The repeat control 148 can indicate the type of HARQ used, the position or location of the data being retransmitted, such as a start position for reading from a circular buffer, the sequence or order of the data, or a combination thereof for the repeat data 146. The repeat control 148 can be included in a format portion, header portion, or a combination thereof for the repeat data 146.

The communication system 100 can have other instances of the receiver signal 128 between the preceding data 144 and the repeat data 146. The mobile device 102 can receive a subsequent data 150 between the preceding data 144 and the repeat data 146. The subsequent data 150 can be before or after the repeat request 142. The subsequent data 150 can be independent of the repeat request 142.

For example, the preceding data 144 can be an instance of the transmission block 124 received by the mobile device 102 at an initial marker of 't-1' for noting time or index for communication. The communication system 100 can process the preceding data 144, send the repeat request 142, and receive the repeat data 146 at a repeat marker for time or index represented by 't'.

Continuing with the example, the communication system 100 can receive the subsequent data 150 between the initial marker and the repeat marker. The subsequent data 150 can be a different instance of the transmission block 124 from the preceding data 144 while the repeat data 146 can be a related instance of the transmission block 124 compared to the preceding data 144.

Figure 2:
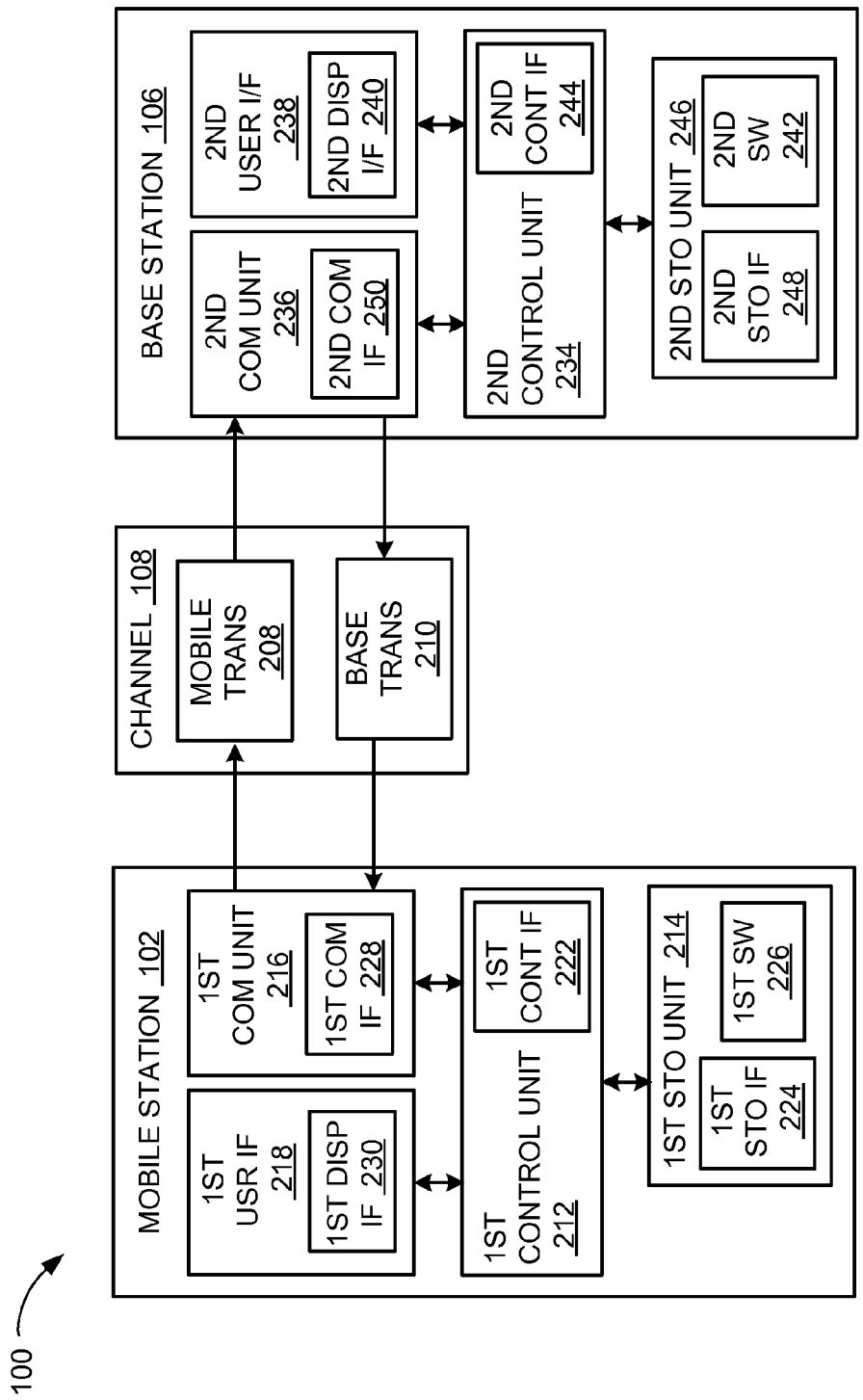
FIG. 2 is an exemplary block diagram of the communication system.

Referring now to FIG. 2, therein is shown an exemplary block diagram of the communication system 100. The communication system 100 can include the mobile device 102, the network 104, and the base station 106. The mobile device 102 can send information in a first device transmission 208 over the network 104 to the base station 106. The base station 106 can send information in a second device transmission 210 over the network 104 to the mobile device 102.

For illustrative purposes, the communication system 100 is shown with the mobile device 102 as a client device, although it is understood that the communication system 100 can have the mobile device 102 as a different type of device. For example, the mobile device 102 can be a server having a display interface.

Also for illustrative purposes, the communication system 100 is shown with the base station 106 in association with a server, although it is understood that the communication system 100 can have the base station 106 as a different type of device. For example, the base station 106 can be a client device.

For brevity of description in this embodiment of the present invention, the mobile device 102 will be described as a client device and the base station 106 will be described as a server device. The embodiment of the present invention is not limited to this selection for the type of devices. The selection is an example of an embodiment of the present invention.

The mobile device 102 can include a first control unit 212, a first storage unit 214, a first communication unit 216, and a first user interface 218. The first control unit 212 can include a first control interface 222. The first control unit 212 can execute a first software 226 to provide the intelligence of the communication system 100.

The first control unit 212 can be implemented in a number of different manners. For example, the first control unit 212 can be a processor, an application specific integrated circuit (ASIC) an embedded processor, a microprocessor, a hardware control logic, a hardware finite state machine (FSM), a digital signal processor (DSP), or a combination thereof. The first control interface 222 can be used for communication between the first control unit 212 and other functional units in the mobile device 102. The first control interface 222 can also be used for communication that is external to the mobile device 102.

The first control interface 222 can receive information from the other functional units or from external sources, or can transmit information to the other functional units or to external destinations. The external sources and the external destinations refer to sources and destinations external to the mobile device 102.

The first control interface 222 can be implemented in different ways and can include different implementations depending on which functional units or external units are being interfaced with the first control interface 222. For example, the first control interface 222 can be implemented with a pressure sensor, an inertial sensor, a microelectromechanical system (MEMS), optical circuitry, waveguides, wireless circuitry, wireline circuitry, or a combination thereof.

The first storage unit 214 can store the first software 226. The first storage unit 214 can also store the relevant information, such as data representing incoming images, data representing previously presented image, sound files, or a combination thereof.

The first storage unit 214 can be a volatile memory, a nonvolatile memory, an internal memory, an external memory, or a combination thereof. For example, the first storage unit 214 can be a nonvolatile storage such as non-volatile random access memory (NVRAM), Flash memory, disk storage, or a volatile storage such as static random access memory (SRAM).

The first storage unit 214 can include a first storage interface 224. The first storage interface 224 can be used for communication between and other functional units in the mobile device 102. The first storage interface 224 can also be used for communication that is external to the mobile device 102.

The first storage interface 224 can receive information from the other functional units or from external sources, or can transmit information to the other functional units or to external destinations. The external sources and the external destinations refer to sources and destinations external to the mobile device 102.

The first storage interface 224 can include different implementations depending on which functional units or external units are being interfaced with the first storage unit 214. The first storage interface 224 can be implemented with technologies and techniques similar to the implementation of the first control interface 222.

The first communication unit 216 can enable external communication to and from the mobile device 102. For example, the first communication unit 216 can permit the mobile device 102 to communicate with the base station 106 of FIG. 1, an attachment, such as a peripheral device or a computer desktop, and the network 104.

The first communication unit 216 can also function as a communication hub allowing the mobile device 102 to function as part of the network 104 and not limited to be an end point or terminal unit to the network 104. The first communication unit 216 can include active and passive components, such as microelectronics or an antenna, for interaction with the network 104.

The first communication unit 216 can include a first communication interface 228. The first communication interface 228 can be used for communication between the first communication unit 216 and other functional units in the mobile device 102. The first communication interface 228 can receive information from the other functional units or can transmit information to the other functional units.

The first communication interface 228 can include different implementations depending on which functional units are being interfaced with the first communication unit 216. The first communication interface 228 can be implemented with technologies and techniques similar to the implementation of the first control interface 222.

The first user interface 218 allows a user (not shown) to interface and interact with the mobile device 102. The first user interface 218 can include an input device and an output device. Examples of the input device of the first user interface 218 can include a keypad, a touchpad, soft-keys, a keyboard, a microphone, an infrared sensor for receiving remote signals, or any combination thereof to provide data and communication inputs.

The first user interface 218 can include a first display interface 230. The first display interface 230 can include a display, a projector, a video screen, a speaker, or any combination thereof.

The first control unit 212 can operate the first user interface 218 to display information generated by the communication system 100. The first control unit 212 can also execute the first software 226 for the other functions of the communication system 100. The first control unit 212 can further execute the first software 226 for interaction with the network 104 via the first communication unit 216.

The base station 106 can be optimized for implementing an embodiment of the present invention in a multiple device embodiment with the mobile device 102. The base station 106 can provide the additional or higher performance processing power compared to the mobile device 102. The base station 106 can include a second control unit 234, a second communication unit 236, and a second user interface 238.

The second user interface 238 allows a user (not shown) to interface and interact with the base station 106. The second user interface 238 can include an input device and an output device. Examples of the input device of the second user interface 238 can include a keypad, a touchpad, soft-keys, a keyboard, a microphone, or any combination thereof to provide data and communication inputs. Examples of the output device of the second user interface 238 can include a second display interface 240. The second display interface 240 can include a display, a projector, a video screen, a speaker, or any combination thereof.

The second control unit 234 can execute a second software 242 to provide the intelligence of the base station 106 of the communication system 100. The second software 242 can operate in conjunction with the first software 226. The second control unit 234 can provide additional performance compared to the first control unit 212.

The second control unit 234 can operate the second user interface 238 to display information. The second control unit 234 can also execute the second software 242 for the other functions of the communication system 100, including operating the second communication unit 236 to communicate with the mobile device 102 over the network 104.

The second control unit 234 can be implemented in a number of different manners. For example, the second control unit 234 can be a processor, an embedded processor, a microprocessor, hardware control logic, a hardware finite state machine (FSM), a digital signal processor (DSP), or a combination thereof.

The second control unit 234 can include a second control interface 244. The second control interface 244 can be used for communication between the second control unit 234 and other functional units in the base station 106. The second control interface 244 can also be used for communication that is external to the base station 106.

The second control interface 244 can receive information from the other functional units or from external sources, or can transmit information to the other functional units or to external destinations. The external sources and the external destinations refer to sources and destinations external to the base station 106.

The second control interface 244 can be implemented in different ways and can include different implementations depending on which functional units or external units are being interfaced with the second control interface 244. For example, the second control interface 244 can be implemented with a pressure sensor, an inertial sensor, a microelectromechanical system (MEMS), optical circuitry, waveguides, wireless circuitry, wireline circuitry, or a combination thereof.

A second storage unit 246 can store the second software 242. The second storage unit 246 can also store data such as data representing incoming images, data representing previously presented image, sound files, or a combination thereof. The second storage unit 246 can be sized to provide the additional storage capacity to supplement the first storage unit 214.

For illustrative purposes, the second storage unit 246 is shown as a single element, although it is understood that the second storage unit 246 can be a distribution of storage elements. Also for illustrative purposes, the communication system 100 is shown with the second storage unit 246 as a single hierarchy storage system, although it is understood that the communication system 100 can have the second storage unit 246 in a different configuration. For example, the second storage unit 246 can be formed with different storage technologies forming a memory hierarchal system including different levels of caching, main memory, rotating media, or off-line storage.

The second storage unit 246 can be a volatile memory, a nonvolatile memory, an internal memory, an external memory, or a combination thereof. For example, the second storage unit 246 can be a nonvolatile storage such as non-volatile random access memory (NVRAM), Flash memory, disk storage, or a volatile storage such as static random access memory (SRAM).

The second storage unit 246 can include a second storage interface 248. The second storage interface 248 can be used for communication between other functional units in the base station 106. The second storage interface 248 can also be used for communication that is external to the base station 106.

The second storage interface 248 can receive information from the other functional units or from external sources, or can transmit information to the other functional units or to external destinations. The external sources and the external destinations refer to sources and destinations external to the base station 106.

The second storage interface 248 can include different implementations depending on which functional units or external units are being interfaced with the second storage unit 246. The second storage interface 248 can be implemented with technologies and techniques similar to the implementation of the second control interface 244.

The second communication unit 236 can enable external communication to and from the base station 106. For example, the second communication unit 236 can permit the base station 106 to communicate with the mobile device 102 over the network 104.

The second communication unit 236 can also function as a communication hub allowing the base station 106 to function as part of the network 104 and not limited to be an end point or terminal unit to the network 104. The second communication unit 236 can include active and passive components, such as microelectronics or an antenna, for interaction with the network 104.

The second communication unit 236 can include a second communication interface 250. The second communication interface 250 can be used for communication between the second communication unit 236 and other functional units in the base station 106. The second communication interface 250 can receive information from the other functional units or can transmit information to the other functional units.

The second communication interface 250 can include different implementations depending on which functional units are being interfaced with the second communication unit 236. The second communication interface 250 can be implemented with technologies and techniques similar to the implementation of the second control interface 244.

The first communication unit 216 can couple with the network 104 to send information to the base station 106 in the first device transmission 208. The base station 106 can receive information in the second communication unit 236 from the first device transmission 208 of the network 104.

The second communication unit 236 can couple with the network 104 to send information to the mobile device 102 in the second device transmission 210. The mobile device 102 can receive information in the first communication unit 216 from the second device transmission 210 of the network 104. The communication system 100 can be executed by the first control unit 212, the second control unit 234, or a combination thereof. For illustrative purposes, the base station 106 is shown with the partition having the second user interface 238, the second storage unit 246, the second control unit 234, and the second communication unit 236, although it is understood that the base station 106 can have a different partition. For example, the second software 242 can be partitioned differently such that some or all of its function can be in the second control unit 234 and the second communication unit 236. Also, the base station 106 can include other functional units not shown in FIG. 2 for clarity.

The functional units in the mobile device 102 can work individually and independently of the other functional units. The mobile device 102 can work individually and independently from the base station 106 and the network 104.

The functional units in the base station 106 can work individually and independently of the other functional units. The base station 106 can work individually and independently from the mobile device 102 and the network 104.

For illustrative purposes, the communication system 100 is described by operation of the mobile device 102 and the base station 106. It is understood that the mobile device 102 and the base station 106 can operate any of the modules and functions of the communication system 100.

Figure 3:
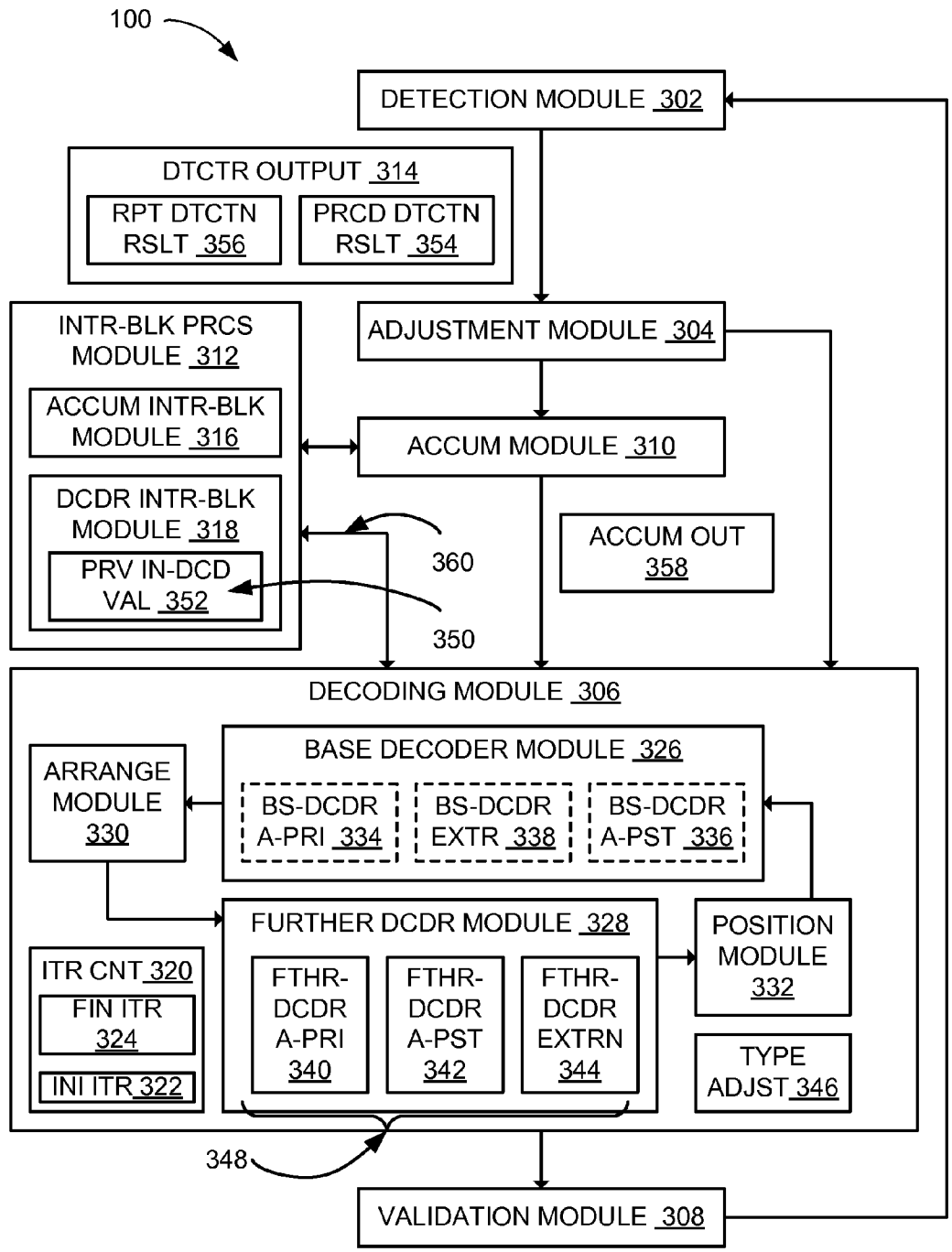
FIG. 3 is a control flow of the communication system.

Referring now to FIG. 3, therein is shown a control flow of the communication system 100. The communication system 100 can include a detection module 302, an adjustment module 304, a decoding module 306, and a validation module 308. The communication system 100 can further include an accumulator module 310 and an inter-block processing module 312.

The detection module 302 can be coupled to the adjustment module 304, which can be coupled to the decoding module 306. The adjustment module 304 can also be coupled to the accumulator module 310, which can be coupled to the inter-block processing module 312 and the decoding module 306. The inter-block processing module 312 can also be coupled to the decoding module 306, which can be coupled to the validation module 308. The validation module 308 can be further coupled to the detection module 302.

The modules can be coupled to each other in a variety of ways. For example, one or more outputs from one module, such as the detection module 302 or the decoding module 306, can be connected to one or more inputs of another module, such as the adjustment module 304, the validation module 308, the inter-block processing module 312, the accumulator module 310, or a combination thereof.

The detection module 302 is configured to receive communication signals. The detection module 302 can receive the receiver signal 128 of FIG. 1 by recording the changes detected through the receiving antennas, analyze the transmitter channel 126 of FIG. 1, analyze the receiver signal 128 for sequences of the symbol 118 of FIG. 1, or a combination thereof.

The detection module 302 can analyze the transmitter channel 126 by determining the channel estimate 130 of FIG. 1. The detection module 302 can determine the channel estimate 130 by analyzing the reference portion of the receiver signal 128. The detection module 302 can compare the reference portion of the receiver signal 128 with the transmitted instance of the reference portion.

For example, the detection module 302 can determine the channel estimate 130 as a difference in amplitude, phase, frequency, signal shape, power, or a combination thereof between the reference portion of the receiver signal 128 and the transmitted instance of the reference portion. The transmitted instance of the reference portion can be predetermined by the communication system 100 or a communication standard.

The detection module 302 can analyze the receiver signal 128 for sequence of the symbol 118 by calculating likelihood values. The detection module 302 can generate a detector output 314 using the likelihood values. The detector output 314 is a likelihood value or a set of likelihood values for one or more portions in the receiver signal 128 corresponding to a particular value or instance for the symbol 118 in the modulation scheme 120 of FIG. 1.

The detection module 302 can generate the detector output 314 for representing a likelihood or a set of likelihoods that a portion of the receiver signal 128 was transmitted as a particular value or instance of the symbol 118. The detection module 302 can calculate a log-likelihood ratio (LLR) for the one or more portions of the receiver signal 128. The detection module 302 can calculate the set of likelihood values having a likelihood value corresponding to each symbol in the modulation scheme 120 for all possible instances of the symbol 118 according to the modulation scheme 120.

The receiver signal 128 can be expressed as:

$$r_{t,k} = a_{t,k} x_k + n_{t,k}.$$ Equation (1).

The term '$r_t$' can be the receiver signal 128 with the vector of received complex channel symbols at transmission t≤T. The term '$r_{t,k}$' can be for the kth symbol. The terms '$a_{t,k}$' and '$n_{t,k}$' can be the kth zero mean complex Gaussian fading channel coefficient and the complex Gaussian noise with variance $2\sigma_n^2$ respectively. The terms '$a_{t,k}$' and '$n_{t,k}$' can be represented by the channel estimate 130, a noise measurement, or a combination thereof. Equation (1) can represent the receiver signal 128 for the single-input single-output scheme 132 of FIG. 1.

The detection module 302 can use a logarithmic maximum a-posteriori (log-MAP) scheme to generate the detector output 314. The detection module 302 can generate the detector output 314 using:

$$X_{t,k,n} = \log \Sigma_{\Theta \in S_n^1} F(r_{t,k}|\Theta) - \log \Sigma_{\Theta \in S_n^0} F(r_{t,k}|\Theta).$$ Equation (2).

The term '$X_{t,k,n}$' can represent the log-likelihood ratio of the nth bit of the kth symbol. The terms '$S_n^1$' and '$S_n^0$' can be a set of symbols from the modulated constellation associated with the modulation scheme 120 with 0 and 1 in their nth position respectively. The term 'log $F(r_{t,k}|\Theta)$' can be represented by:

$$\log F(r_{t,k}|\Theta) = \frac{-\|r_{t,k} - a_{t,k}\Theta\|^2}{2\sigma_n^2}.$$ Equation (3).

The detection module 302 can also use a maximum logarithmic MAP (MLM) scheme to generate the detector output 314. The detection module 302 can generate the detector output 314 using Equation (2). The detection module 302 can further use approximation of:

$$\log \Sigma_j F_j \approx \max_j \log F_j.$$ Equation (4).

The receiver signal 128 can also be expressed as:

$$r_{t,k} = H_{t,k} x_{t,k} + n_{t,k}.$$ Equation (5).

The term '$x_{t,k}$' can be $N_t \times 1$ transmitted vector constituting of $x_{t,k}^d$ for d=1, 2, ... $N_t$. The term '$H_{t,k}$' can be $N_r \times N_t$ complex channel matrix for the channel estimate 130, and the term '$n_{t,k}$' can be a noise vector independent and identically distributed (iid) with circularly symmetric Gaussian distribution with zero mean and covariance of $2\sigma_n^2 I_{N_r}$. The receiver signal 128 can be for the multiple-input multiple-output scheme 134 of FIG. 1 for the communication system 100 having a size of $N_r \times N_t$, with '$N_t$' spatial streams and '$N_r$' receive antennas.

In case of independent soft-output detection of the receiver signal 128, the detection module 302 can generate the detector output 314 as a log-likelihood of the receiver signal 128 given the $N_r \times 1$ vector '$\xi$' drawn from the multidimensional constellation set $\Psi = \chi^{N_t}$. The detection module 302 can generate the detector output 314 using:

$$\log F(r_{t,k}|\xi) = \frac{-\|r_{t,k} - H_{t,k}\xi\|^2}{2\sigma_n^2}.$$ Equation (6).

The detection module 302 utilizing the MAP scheme can generate the detector output 314 corresponding to the nth bit of the kth symbol in the dth transmitted stream at the tth transmission as:

$$X_{t,k,n}^d = \log \sum_{\xi \in \Psi_{n,d}^{(1)}} F(r_{t,k}|\xi) - \log \sum_{\xi \in \Psi_{n,d}^{(0)}} F(r_{t,k}|\xi).$$ Equation (7).

For Equation (7), the term '$\Psi_{n,d}^{(\epsilon)}$' can be represented as:

$$\Psi_{n,d}^{(\epsilon)} = \{\xi \in \Psi : \xi(n,d) = \epsilon\}.$$ Equation (8).

The term '$\xi(n,d)$' can represent the bit value at the nth bit-coordinate of the dth dimension or stream for the receiver signal 128.

The detection module 302 can also use the MLM scheme to generate the detector output 314. The detection module 302 can generate the detector output 314 using the approximation expressed in Equation (4).

For illustrative purposes the detection module 302 is described as receiving the receiver signal 128 or estimating the channel estimate 130. However, it is understood that such functions can be separated out into a separate module and the detection module 302 can analyze the sequence of the symbol 118.

The detection module 302 can use the first communication unit 216 of FIG. 2, the second communication unit 236 of FIG. 2, the first control unit 212 of FIG. 2, the second control unit 234 of FIG. 2, or a combination thereof to generate the detector output 314, receive the receiver signal 128, determine the channel estimate 130, or a combination thereof. The detection module 302 can store the receiver signal 128, the channel estimate 130, the detector output 314, or a combination thereof in the first storage unit 224 of FIG. 2, the second storage unit 246 of FIG. 2, or a combination thereof.

After generating the detector output 314, the control flow can pass the from the detection module 302 to the adjustment module 304. The control flow can be passed by having processing results of the detection module 302, such as the receiver signal 128, the channel estimate 130, the detector output 314, or a combination thereof, pass from the detection module 302 as input to the adjustment module 304, by storing the processing results at a location known and accessible to the adjustment module 304, by notifying the adjustment module 304, such as by using a flag, an interrupt, a status signal, or a combination, or a combination of processes thereof.

The adjustment module 304 is configured to rearrange the receiver signal 128, the detector output 314, or a combination thereof according to the coding scheme. The adjustment module 304 can de-interleave the symbols, the bits corresponding to the symbols, or a combination thereof for the receiver signal 128, the detector output 314, or a combination thereof. The adjustment module 304 can de-interleave the receiver signal 128 the detector output 314, or a combination thereof based on a method, an order, a sequence, a position, or a combination thereof predetermined by the communication system 100. For example, the adjustment module 304 can de-interleave the receiver signal 128, the detector output 314, or a combination thereof based on turbo coding or polar coding.

The adjustment module 304 can de-multiplex and form the vector based on the detector output 314 for the tth transmission $X_t$. The adjustment module 304 can de-interleave the vector of demodulator a posteriori (APP) LLRs for the $t^{th}$ transmission $X_t$, which can be represented as '$\Pi_1^{-1}$'. An de-interleaved output of the adjustment module 304 can be represented as:

$$L_{t(No\ Comb)} = \Pi_1^{-1}(X_t). \quad \text{Equation (9).}$$

For the multiple-input multiple-output scheme 134, the de-interleaved output of the adjustment module 304 can be represented as:

$$L_{t(No\ Comb)}^d = \Pi_1^{-1}(X_t^d). \quad \text{Equation (10).}$$

The adjustment module 304 can use the first communication unit 216, the second communication unit 236, the first control unit 212, the second control unit 234, or a combination thereof to de-interleave the receiver signal 128, the detector output 314, or a combination thereof. The adjustment module 304 can store the rearranged or de-interleaved instance of the receiver signal 128, the detector output 314, or a combination thereof in the first storage unit 224, the second storage unit 246, or a combination thereof.

After rearranging or de-interleaving, the control flow can pass from the adjustment module 304 to the accumulator module 310, the decoding module 306, or a combination thereof. The control flow can pass similarly as described above between the detection module 302 and the adjustment module 304 but using processing results of the adjustment module 304 instead of results of the detection module 302.

The accumulator module 310 is configured to gather repeated information. The accumulator module 310 can gather the preceding data 144 of FIG. 1 and the repeat data 146 of FIG. 1 when the repeat request 142 of FIG. 1 is communicated. Initially, prior to determining or communicating the repeat request 142, the accumulator module 310 can store the receiver signal 128 as the preceding data 144 using the inter-block processing module 312.

The inter-block processing module 312 is configured to process previously communicated information along with the repeated information. The inter-block processing module 312 can process the preceding data 144 for processing the repeat data 146 at a later time.

The inter-block processing module 312 can include an accumulator inter-block module 316 and a decoder inter-block module 318. The decoder inter-block module 318 will be discussed in detail below. The accumulator inter-block module 316 is configured to process the preceding data 144, the detector output 314 corresponding thereto, or a combination thereof for a latter processing with the repeat data 146 when the repeat request 142 is necessary.

For example, the accumulator inter-block module 316 can be implemented as additional memory, firmware, or a combination thereof for storing values across processing the transmission block 124 of FIG. 1 for the receiver signal 128. Also for example, the accumulator inter-block module 316 can be an application or a portion therein for recognizing a non-repeated instance the receiver signal 128 and storing it as the preceding data 144.

As a more specific example, the accumulator inter-block module 316 can check the header or formatting portion of the receiver signal 128. The accumulator inter-block module 316 can store the receiver signal 128 without an indication for the repeat data 146, reference to the repeat request 142 or the preceding data 144, the repeat control 148 of FIG. 1 combination thereof as the preceding data 144.

After storing the preceding data 144, the control flow can pass from the inter-block processing module 312 or the accumulator module 310 to the decoding module 306. The control flow can also pass directly from the adjustment module 304 to the decoding module 306. The control flow can pass similarly as described above between the detection module 302 and the adjustment module 304 but using processing results of the accumulator module 310, the inter-block processing module 312, the adjustment module 304, or a combination thereof instead of results of the detection module 302.

The decoding module 306 is configured to further analyze for individual symbols or bits within the receiver signal 128, or a derivation thereof. The decoding module 306 can further calculate likelihoods for the receiver signal 128, select a sequence of values or instances for the symbol 118 or the bit likely to be the communication content 108 of FIG. 1, or a combination thereof. The decoding module 306 can calculate likelihoods for the information portion 114 of FIG. 1 of the code words 112 of FIG. 1 for the receiver signal 128.

The decoding module 306 can use an iteration count 320 for further analyzing the receiver signal 128. The iteration count 320 can start at an initial iteration 322, such as 0 or 1, and go up to, including, or a combination thereof for a final iteration 324. The final iteration 324 can be based on a size of the information portion 114, the parity portion 116 of FIG. 1, the code words 112, the transmission block 124, or a combination thereof.

For example, the decoding module 306 can decode the information portion 114, the parity portion 116, or a combination thereof for one or more instances of the code words 112 using the iteration count 320 through the initial iteration 322 or the final iteration 324. Also for example, the decoding module 306 can decode the information portion 114, the parity portion 116, or a combination thereof for the transmission block 124 using the iteration count 320 through the final iteration 324.

The decoding module 306 can include a base decoder module 326, a further decoder module 328, an arrangement module 330, and a position module 332. The base decoder module 326 and the further decoder module 328 are configured to decode the receiver signal 128 based on different constituent code.

For example, the transmission signal can be encoded using nominal rate ⅓, such as where the information portion 114 has a size ⅓ of a size of the parity portion 116, with two constituent (13, 15) Recursive Systematic Convolutional (RSC) encoders. The base decoder module 326 and the further decoder module 328 can decode the code words 112 from the receiver signal 128 corresponding to each of the two constituent RSC encoding.

The base decoder module 326 and the further decoder module 328 can decode the receiver signal 128 by calculating and using a likelihood or a set of likelihoods that a portion of the receiver signal 128 corresponds to a particular symbol or a particular bit associated with the communication content 108. For example, the base decoder module 326 can calculate, use, or a combination thereof for a base-decoder a-priori value 334, a base-decoder a-posteriori value 336, a base-decoder extrinsic value 338, or a combination thereof. Also for example, the further decoder module 328 can calculate, use, or a combination thereof for a further-decoder a-priori value 340, a further-decoder a-posteriori value 342, a further-decoder extrinsic value 344, or a combination thereof.

The base-decoder a-priori value 334 is a prior knowledge for the base decoder module 326 about the communication content 108, the transmitter signal 110 of FIG. 1, the receiver signal 128, a symbol therein, a bit therein, or a combination thereof. The further-decoder a-priori value 340 is a prior knowledge for the further decoder module 328 about the communication content 108, the transmitter signal 110, the receiver signal 128, a symbol therein, a bit therein, or a combination thereof.

The base-decoder a-priori value 334 and the further-decoder a-priori value 340 can each be one or more measures of confidence levels associated with a likely transmitted symbol or likelihoods for all possible symbols, or the associated bit values, corresponding to the analyzed portion in the receiver signal 128. The base-decoder a-priori value 334 and the further-decoder a-priori value 340 can each be LLR values.

The base-decoder a-priori value 334 and the further-decoder a-priori value 340 can each be expressed as:

$$L^a(b_i) = \log \frac{p(b_i = +1)}{p(b_i = -1)}.$$   Equation (11).

The base-decoder a-priori value 334 and the further-decoder a-priori value 340 can be a logarithmic result of a ratio between a probability that a certain bit or symbol within the receiver signal 128 had a transmitted value of +1 and a different probability that the same bit or symbol had a transmitted value of −1 or 0.

The base decoder module 326 can determine a value resulting from a module external to the base decoder module 326, such as the further decoder module 328, the position module 332, the accumulator module 310, the inter-block processing module 312, or a combination thereof, as the base-decoder a-priori value 334. The base decoder module 326 can also determine a value resulting from a previous iteration in determining the communication content 108 as the base-decoder a-priori value 334. Similarly, the further decoder module 328 can determine a value resulting from a module external to the further decoder module 328, from a previous iteration, or a combination thereof as the further-decoder a-priori value 340.

The base-decoder a-posteriori value 336 is a later or calculated knowledge for the base decoder module 326 about the communication content 108, the transmitter signal 110, the receiver signal 128, a symbol therein, a bit therein, or a combination thereof. The further-decoder a-posteriori value 342 is a later or calculated knowledge for the further decoder module 328 about the communication content 108, the transmitter signal 110, the receiver signal 128, a symbol therein, a bit therein, or a combination thereof.

The base-decoder extrinsic value 338 is new information for the base decoder module 326, not derived from received information. The further-decoder extrinsic value 344 is new information for the further decoder module 328, not derived from received information.

The base decoder module 326 can calculate the base-decoder extrinsic value 338 by calculating a difference between the base-decoder a-posteriori value 336 and the base-decoder a-priori value 334. Similarly, the further decoder module 328 can calculate the further-decoder extrinsic value 344 by calculating a difference between the further-decoder a-posteriori value 342 and the further-decoder a-priori value 340. The base decoder module 326 and the further decoder module 328 can calculate the base-decoder extrinsic value 338 and the further-decoder extrinsic value 344 using the Log-MAP scheme or the MLM scheme.

The base decoder module 326 and the further decoder module 328 can utilize the Log-MAP (LM) scheme or the scaled MLM (S-MLM) scheme using a type adjustment 346. The type adjustment 346 can be a scalar value for adjusting the base-decoder extrinsic value 338, the further-decoder extrinsic value 344, or a combination thereof. The type adjustment 346 can be used to adjust the base-decoder extrinsic value 338, the further-decoder extrinsic value 344, or a combination thereof based on using the LM scheme or the S-MLM scheme. For example, the type adjustment 346 can be 1 when the LM scheme is used and 0.7 when the S-MLM scheme is used.

The arrangement module 330 and the position module 332 can receive the base-decoder extrinsic value 338 and the further-decoder extrinsic value 344. The arrangement module 330 can receive the base-decoder extrinsic value 338 and the position module 332 can receive the further-decoder extrinsic value 344. The arrangement module 330 and the position module 332 can interleave or de-interleave the data based on the coding scheme, and pass the result to the base decoder module 326 and the further decoder module 328 to complete a half instance of the iteration count 320.

The base decoder module 326 can set the data from the position module 332 associated with the further-decoder extrinsic value 344 as the base-decoder a-priori value 334 and repeat the calculation process described above to complete one instance of the iteration count 320. The further decoder module 328 can similarly set the data from the arrangement module 330 associated with the base-decoder extrinsic value 338 as the further-decoder a-priori value 340 and repeat the calculation in completing the iteration count 320.

The decoding module 306 can repeat the processing for the base decoder module 326, the further decoder module 328, the arrangement module 330, the position module 332, or a combination thereof until the iteration count 320 reaches or exceeds the final iteration 324 associated with an end of the receiver signal 128 or if the decoding result is validated by the validation module 308, a size of the transmission block 124, a size of each of the code words 112, a size of the information portion 114, or a combination thereof. The decoding module 306, the base decoder module 326, the further decoder module 328, or a combination thereof can The decoding module 306 can utilize a turbo-principle mechanism 348. The turbo-principle mechanism 348 is a principle or a method for utilizing a-priori, a-posteriori, and extrinsic values based on calculating outcomes in a module without using a previous outcome of the module. The communication system 100 can implement the turbo-principle mechanism 348 by calculating the extrinsic values, interleaving or de-interleaving data, or a combination thereof based on an output value or the a-posteriori value.

The communication system 100 can further implement the turbo-principle mechanism 348 by coupling the detection module 302, the decoding module 306, inter-block processing module 312, the accumulator module 310, the further decoding module 328, or a combination thereof. For example, the communication system 100 can implement the turbo-principle mechanism 348 by pairing the base decoder module 326 and the further decoder module 328, the detection module 302 and the decoding module 306, or a combination thereof. The paired modules can be directly coupled to each other, such as being coupled without any intervening modules or circuitry other than conductors. The paired modules can also be non-directly coupled to each other, such as by having one or more modules or circuitry therebetween.

The decoding module 306 can be further configured to determine the communication content 108. The decoding module 306 can perform hard decisions on the informationbit based on the decoding result, such as the a-posteriori or extrinsic values of the base decoder module 326 and the further decoder module 328. The decoding module 306 can determine a candidate instance of the communication content 108 as a sequence of values for symbols or bits having the highest likelihood of association with portions of the receiver signal 128.

The decoding module 306 can use the first communication unit 216, the second communication unit 236, the first control unit 212, the second control unit 234, or a combination thereof to decode the receiver signal 128. The decoding module 306 can pass the base-decoder extrinsic value 338, the further-decoder extrinsic value 344, or a combination thereof to the inter-block processing module 312.

The inter-block processing module 312 can include the decoder inter-block module 318. The decoder inter-block module 318 is configured to process decoding results for a latter processing with the repeat data 146 when the repeat request 142 is necessary. The decoder inter-block module 318 can store the base-decoder extrinsic value 338, the further-decoder extrinsic value 344, or a combination thereof as a previous communication value 350, including a previous inner-decoder value 352.

The previous communication value 350 is a value based on processing of the preceding data 144 for processing the repeat data 146. The previous inner-decoder value 352 is a type of the previous communication value 350 based on the decoding result of the preceding data 144. The inter-block processing module 312 can determine the previous communication value 350 based on the receiver signal 128 corresponding to the preceding data 144, or the processing results thereof. For example, the decoder inter-block module 318 can generate the previous inner-decoder value 352 based on the further-decoder extrinsic value 344 corresponding to the preceding data 144.

For example, the decoding module 306 can pass the base-decoder extrinsic value 338, the further-decoder extrinsic value 344, or a combination thereof after each of the iterations. The decoder inter-block module 318 can store the base-decoder extrinsic value 338, the further-decoder extrinsic value 344, or a combination thereof in sequence as the previous inner-decoder value 352. Also for example, the decoder inter-block module 318 can overwrite the base-decoder extrinsic value 338, the further-decoder extrinsic value 344, or a combination thereof after each of the iterations and store only the latest decoding result for the previous inner-decoder value 352.

As a more specific example, the decoder inter-block module 318 can be implemented as additional memory, firmware, or a combination thereof for storing processing results across the transmission block 124 for the receiver signal 128. As a further specific example, the decoder inter-block module 318 can be an application or a portion therein for organizing the previous communication value 350, including the previous inner-decoder value 352.

The inter-block processing module 312 can use the first communication unit 216, the second communication unit 236, the first control unit 212, the second control unit 234, or a combination thereof to arrange, recognize, manage, or a combination thereof for processing the preceding data 144. The inter-block processing module 312 can store the preceding data 144, the previous communication value 350, or a combination thereof in the first storage unit 224, the second storage unit 246, or a combination thereof.

After determining the previous communication value 350, the control flow can pass from the decoding module 306 to the validation module 308. The control flow can pass similarly as described above between the detection module 302 and the adjustment module 304 but using processing results of the decoding module 306 instead of results of the detection module 302.

The validation module 308 is configured to verify the communication content 108 based on the processing result. The validation module 308 can perform an error check on the decoding result from the decoding module 306. For example, the validation module 308 can perform a cyclic redundancy check (CRC) or low-density parity-check (LDPC).

The validation module 308 can verify the communication content 108 as the decoding result from the decoding module 306 when it passes the error check. The validation module 308 can verify the communication content 108 as the decoding result passing the error check. The validation module 308 can transmit the ACK for the repeat request 142. When the decoding result does not pass the error check, the validation module 308 can transmit the NACK for the repeat request 142 corresponding to the preceding data 144 including the communication content 108 therein.

The validation module 308 can use the first communication unit 216, the second communication unit 236, the first control unit 212, the second control unit 234, or a combination thereof to perform the error check. The validation module 308 can use the first communication unit 216, the second communication unit 236, or a combination thereof to transmit the repeat request 142.

For illustrative purposes, the communication system 100 will be described as including a failed error check in processing the receiver signal 128 and having communicated the NACK for the repeat request 142. However, it is understood that the communication system 100 can also have instances of successful error check, without communicating the repeat request 142 or the ACK, or a combination thereof.

Also for illustrative purposes, the communication system 100 has been described as storing processing results, such as the detector output 314 or the previous communication value 350, after processing for the results. However, it is understood that the communication system 100 can store the processing results for the receiver signal 128 corresponding to the preceding data 144 when the decoding result does not pass the error check.

The communication system 100 can continue to process other communicated content as described above until receiving the repeat data 146 corresponding to the repeat request 142 for the preceding data 144. The detection module 302 can identify the repeat data 146 corresponding to the repeat request 142 from the receiver signal 128. For example, the detection module 302 can check the header or formatting portion of the receiver signal 128 for the repeat control 148. Also for example, the detection module 302 can check the header or formatting portion for any references to the repeat request 142, the preceding data 144, or a combination thereof.

The detection module 302 can generate the detector output 314 for the repeat data 146 similar to the method described above. The detection module 302 can generate the detector output 314 as a preceding detection result 354 based on detecting and receiving the preceding data 144, and generate the detector output 314 as a repeat detection result 356 corresponding to the repeat data 146.

The adjustment module 304 can similarly rearrange the repeat data 146, the detector output 314, or a combination thereof as described above. The adjustment module 304 can further de-puncture the repeat data 146, the detector output 314, or a combination thereof.

The adjustment module 304 can de-puncture the repeat data 146, the detector output 314, or a combination thereof by using the repeat control 148 to determine non-transmitted bits, or bits in the preceding data 144 that were not repeated in the repeat data 146. The adjustment module 304 can further de-puncture by adjusting the repeat data 146, the detector output 314, or a combination thereof such that any punctured bits can have zero LLR values in the repeat data 146, the detector output 314, or a combination thereof.

The accumulator module 310 can be configured to combine the repeat data 146 and the preceding data 144, the repeat detection result 356 and the preceding detection result 354, or a combination thereof. The accumulator module 310 can combine the data resulting from the de-puncturing with the data processed by the accumulator inter-block module 316 to generate an accumulation output 358. The accumulator module 310 can generate the accumulation output 358 based on combining the preceding data 144 and the repeat data 146.

The accumulation output 358 can be the repeat data 146 and the preceding data 144, the repeat detection result 356 and the preceding detection result 354, or a combination thereof.

The decoding module 306 can be configured to decode the accumulation output 358. The decoding module 306 can decode the accumulation output 358 using one or more processing result across previous instances of the transmission block 124 for the preceding data 144. The decoding module 306 can decode the accumulation output 358 similarly as described above, but using the previous communication value 350.

For example, the base-decoder a-posteriori value 336 or a decoder output value for the information portion 114 from the base decoder module 326 after the ith decoding iteration of the tth transmission can be represented as:

$$\Lambda_{1,t}{}^{i}(s)=L_t(s)+L_{a,1,t}{}^{i}+L_{e,1,t}{}^{i}.$$ Equation (12).

The term '$L_t(s)$' can represent the accumulation output 358 as the vector of systematic channel LLRs input to the decoding module 306. The accumulation output 358 can be the bit combined LLRs for the information portion 114 from the accumulator module 310 that combines result of the de-interleaving process, de-puncturing process, or a combination thereof for the detector output 314 corresponding to the preceding data 144 and the repeat data 146.

Continuing with the example, the term '$L_{a,1,t}{}^{i}$' can represent the base-decoder a-priori value 334 corresponding to the a-priori input for the information portion 114 to the base decoder module 326 at the beginning of the ith decoding iteration of the tth transmission. The term '$L_{e,j,t}{}^{i}$' can represent the base-decoder extrinsic value 338 corresponding to the extrinsic LLR output from the jth constituent decoder for $j\in\{1,2\}$ after the ith decoding iteration, $i\in\{1,2,\ldots,I_m\}$, where $I_m$ is the final iteration 324 for the iteration count 320 per transmission. The term 't' can represent the transmission, where $t\in\{1,2,\ldots,T\}$ and T is the maximum number of transmissions.

Continuing with the example, the decoding module 306, the decoder inter-block module 318, or a combination thereof can determine the base-decoder a-priori value 334 for the information portion 114 based on the previous communication value 350. As a more specific example, the decoding module 306, the decoder inter-block module 318, or a combination thereof can determine the base-decoder a-priori value 334 based on:

$$L_{a,1,t}{}^{1}=S*\Pi_2{}^{-1}(L_{e,2,t-1}{}^{I_m}).$$ Equation (13).

Continuing with the example, the term '$L_{a,1,t}{}^{1}$' can represent the base-decoder a-priori value 334 at the initial iteration 322. The term 'S' can represent the type adjustment 346 and '$\Pi_2$' can represent inner coding interleaving process, such as for the turbo-principle mechanism 348. The term '$L_{e,2,t-1}{}^{I_m}$' represent the previous communication value 350 or the previous inner-decoder value 352.

Also for example, the base-decoder a-posteriori value 336 corresponding to the multiple-input multiple-output scheme 134 for the information portion 114 from the base decoder module 326 for the dth stream, at the ith decoding iteration of the first component decoder for the tth transmission can be represented as:

$$\mathcal{P}_t{}^d(1,i)=L_t{}^d(s)+\mathcal{A}_t{}^d(1,i)+\mathcal{E}_t{}^d(1,i).$$ Equation (14).

The term '$\mathcal{E}_t{}^d(1,i)$' can represent corresponding instance of the base-decoder extrinsic value 338 and '$\mathcal{A}_t{}^d(1,i)$' can represent corresponding instance of the base-decoder a-priori value 334. The term '$L_t{}^d(s)$' can represent the accumulation output 358 corresponding to decoder channel input for the systematic bits of the dth stream, which can be the corresponding detector output accumulated over the preceding data 144 and the repeat data 146.

Continuing with the example, the decoding module 306, the decoder inter-block module 318, or a combination thereof can determine the base-decoder a-priori value 334 corresponding to the multiple-input multiple-output scheme 134 based on the previous communication value 350. As a more specific example, the decoding module 306, the decoder inter-block module 318, or a combination thereof can determine the base-decoder a-priori value 334 based on:

$$\mathcal{A}_t{}^d(1,i)=S*\Pi_2{}^{-1}(\mathcal{E}_t{}^d(2,i-1)).$$ Equation (15).

The term '$\mathcal{E}_t{}^d(2,i-1)$' can represent the previous communication value 350 or the previous inner-decoder value 352 corresponding to the preceding data 144, or the further decoder extrinsic value 344.

For the single-input single-output scheme 132, the multiple-input multiple-output scheme 134, or a combination thereof, such as a multiple-input single-output scheme or a single-input multiple-output scheme, the decoding module 306 can determine the communication content 108 using the previous communication value 350 from a previous instance of the transmission block 124 and the accumulation output 358 from a current instance of the transmission block 124. The decoding module 306 can determine the base-decoder a-priori value 334 corresponding to the repeat data 146 based on the previous inner-decoder value 352 derived from the preceding data 144.

The decoding module 306, the inter-block processing module 312, or a combination thereof can process the previous communication value 350 by storing and using processing results across instances of the transmission block 124. The decoding module 306, the inter-block processing module 312, or a combination thereof can store the further-decoder extrinsic value 344 corresponding to the final iteration 324 for processing the preceding data 144 as the previous inner-decoder value 352.

The decoding module 306, the inter-block processing module 312, or a combination thereof can determine the previous inner-decoder value 352 as the base-decoder a-priori value 334 corresponding to the initial iteration 322 for processing the repeat data 146. The decoding module 306, the inter-block processing module 312, or a combination thereof can observe the turbo-principle mechanism 348 using the previous inner-decoder value 352, such that an output of one module is not fed back into the same module.

The decoding module 306, the inter-block processing module 312, or a combination thereof can further limit the processing for the previous communication value 350. The decoding module 306, the inter-block processing module 312, or a combination thereof can determine a repeat count for a number of repeats for a particular instance of the communication content 108. The repeat count can include a number of instances for the repeat request 142 corresponding to the communication content 108, a number of instances for the repeat data 146 corresponding to the communication content 108 or the repeat request 142, or a combination thereof.

The decoding module 306 and the inter-block processing module 312 can process the previous communication value 350 using a feedback profile 360. The feedback profile 360 can be a sequential grouping of instructions, hardware components, flow or path, or a combination thereof for utilizing previously determined information.

For example, the feedback profile 360 can be firmware or software instructions for using output of the further decoder module 328 from a previous instance of the transmission block 124 as an input of the base decoder module 326 for a latter instance of the transmission block 124. Also for example, the feedback profile 360 can be a set of hardware components, such as wires, buffers, memory, processor, or a combination thereof, for storing the previous communication value 350 across instances of the transmission block 124 and using it as a basis for determining the base-decoder a-priori value 334 for the new instance of the transmission block 124.

The feedback profile 360 can directly couple the further decoder module 328 or the position module 332 to the decoder inter-block module 318 or the further-decoder extrinsic value 344 to the previous inner-decoder value 352 for determining the previous communication value 350. The feedback profile 360 can directly couple the decoder inter-block module 318 and the base decoder module 326 or the previous inner-decoder value 352 to the base-decoder extrinsic value 338 for processing the previous communication value 350 for determining the communication content 108.

The decoding module 306, the inter-block processing module 312, or a combination thereof can control the processing related to the previous communication value 350 based on the repeat count. For example, the decoding module 306, the inter-block processing module 312, or a combination thereof can withhold from updating or determining the previous communication value 350, delete the previous communication value 350, or a combination thereof when the repeat count reaches a repeat limit.

The repeat limit can represent an upper limit for repeating transmissions, such as determined by the communication system 100 or the communication standard. For example, if the total number of retransmissions is limited to 4, the decoding module 306, the inter-block processing module 312, or a combination thereof can delete the previous communication value 350 after determining the base-decoder a-priori value 334 corresponding to the repeat data 146 for the last retransmission. Also for example, the decoding module 306, the inter-block processing module 312, or a combination thereof can withhold from determining the previous communication value 350 at the end of decoding the repeat data 146 for the last retransmission.

Further, the communication system 100 can process all instances of the communication layer 136 of FIG. 1 included in the receiver signal 128 for the multiple-input multiple-output scheme 134. For example, the detection module 302 can detect all streams or layers in the preceding data 144, including the base layer data 138 of FIG. 1 and further layer data 140 of FIG. 1. The decoding module 306 and the inter-block processing module 312 can process data corresponding to all of the layers or streams. The communication module 100 can process all streams or layers in the preceding data 144 before detecting and processing the repeat data 146 or while detecting and processing the repeat data 146.

As a more specific example, the decoding module 306 and the inter-block processing module 312 can have the previous communication value 350 to include information based on all streams or layers in the preceding data 144, including the base layer data 138 and further layer data 140. The decoding module 306 can use the previous communication value 350 comprehensive for all layers of the preceding data 144 to decode the repeat data 146.

Also as an example, the decoding module 306 can use the previous communication value 350 associated with each of the code words 112 in the preceding data 144 for decoding the repeat data 146. The decoding module 306 can use the previous communication value 350 for decoding the corresponding instances of the code words 112, repeated instances of the code words 112, non-repeated instances of the code words 112, or a combination thereof in the repeat data 146.

After determining and validating the communication content 108 from the receiver signal 128, the communication system 100 can communicate the communication content 108 to the user. The base station 106 of FIG. 1, the mobile device 102 of FIG. 1, or a combination thereof can communicate the communication content 108, such as by displaying, generating sounds, processing data, or a combination thereof appropriate for the communication content 108.

The communication system 100 can continue to communicate the subsequent data 150 of FIG. 1 between the preceding data 144 and the repeat data 146. The communication system 100 can store the previous communication value 350 exclusive of processing the subsequent data 150 when the subsequent data 150 is successfully detected and decoded.

The inter-block processing module 312 can further process a different instance of the previous communication value 350 for the subsequent data 150, when the subsequent data 150 is not successfully processed as described above. The inter-block processing module 312 can store and manage multiple instances or values for the previous communication value 350 based on different instances of the receiver signal 128.

It has been discovered that the decoder inter-block module 318 and the decoding module 306 utilizing the feedback profile 360 and the previous communication value 350, including the previous inner-decoder value 352, provide increase in communication speed. The feedback profile 360 and the previous communication value 350 can improve the accuracy of the decoding process for the repeat data 146 by utilizing results of the previous decoding process to refine processing of the repeated information.

It has also been discovered that the previous communication value 350, including the previous inner-decoder value 352, set as the further-decoder extrinsic value 344 corresponding to the final iteration 324 of decoding the preceding data 144, and as basis for the base-decoder a-priori value 334 corresponding to the initial iteration 322 of decoding the repeat data 146 provides reduction of decoding cycles. The use of the previous inner-decoder value 352 across instances of the transmission block 124 provides a relevant and continuous use of processing data for repeated transmissions, which can provide a more relevant and accurate starting point for the repeat data 146 rather than an arbitrary starting point.

Figure 4:
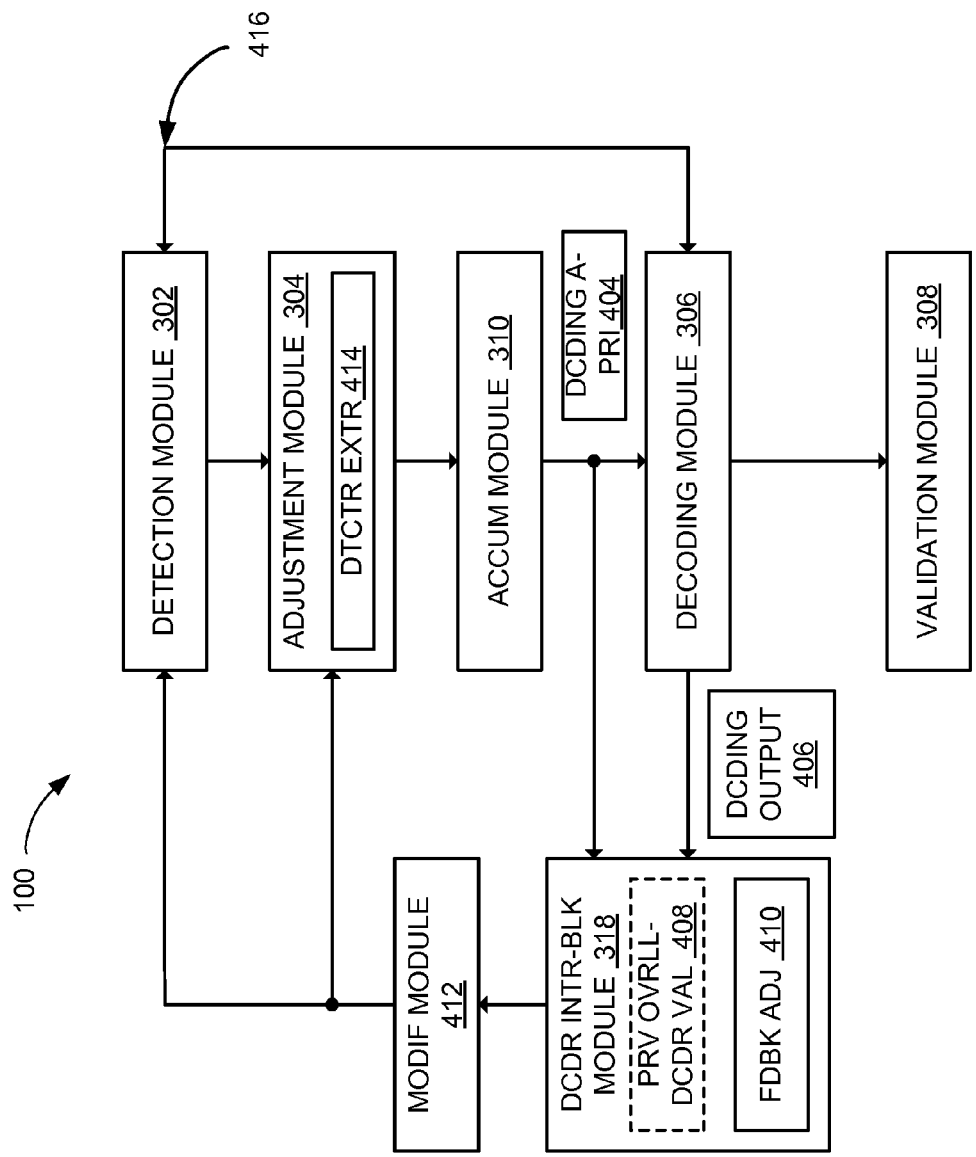
FIG. 4 is a further control flow of the communication system.

Referring now to FIG. 4, therein is shown a further control flow of the communication system 100. The communication system 100 can include a different instance of the feedback profile 360 of FIG. 3. The different instance of the feedback profile 360 can represent a different exemplary embodiment or a different example of a control flow for the previous discussed exemplary embodiment for the communication system 100.

The detection module 302, the adjustment module 304, the accumulator module 310, the decoding module 306, the inter-block processing module 312 of FIG. 3, and the validation module 308 can process the preceding data 144 of FIG. 1 similarly as described above. The decoding module 306 can be further configured to determine or calculate a decoding a-priori value 404 and a decoding output 406.

The decoding a-priori value 404 is a prior knowledge for the decoding module 306 about the communication content 108 of FIG. 1, the transmitter signal 110 of FIG. 1, the receiver signal 128 of FIG. 1, a symbol therein, a bit therein, or a combination thereof. The decoding module 306 can determine the decoding a-priori value 404 as the detector output 314 of FIG. 3, the accumulation output 358 of FIG. 3, a derivative thereof, or a combination thereof.

The decoding output 406 is an overall result of the decoding process. The decoding output 406 can be a sequence of likelihood values corresponding to the receiver signal 128. The decoding output 406 can also be the candidate instance of the communication content 108 based on the LLR values calculated and determined by the decoding process. The decoding output 406 can include values or information associated with both the information portion 114 of FIG. 1 and the parity portion 116 of FIG. 1.

The decoding module 306 can determine the decoding output 406 by combining the decoding results with the detection results, such as by combining information corresponding to the information portion 114 and the parity portion 116. The decoding module 306 can further determine the decoding output 406 be arranging the likelihood values in a sequence corresponding to the receiver signal 128, making hard decisions based on the likelihood values, or a combination thereof, as described above.

The feedback profile 360 can directly couple the accumulator module 310, the decoding module 306, or a combination thereof to the decoder inter-block module 318. Using the feedback profile 360, the decoding module 306 can pass the decoding output 406 to the decoder inter-block module 318.

The decoder inter-block module 318 can process the decoding output 406 across instances of the transmission block 124 of FIG. 1. The decoder inter-block module 318 can include a previous overall-decoding value 408 and a feedback adjustment 410 for processing the decoding output 406 across instances of the transmission block 124.

The previous overall-decoding value 408 is an overall representation of the detection process, the decoding process, or a combination thereof corresponding to the preceding data 144 of FIG. 3. The decoder inter-block module 318 can determine the previous overall-decoding value 408 based on the decoding output 406, such as by assigning the value of the decoding output 406 as the previous overall-decoding value 408, the previous inner-decoder value 352 of FIG. 3, the accumulation output 358, or a combination thereof.

The previous overall-decoding value 408 can include a comprehensive representation of the overall processing for the preceding data 144. For example, the previous overall-decoding value 408 can include both the information portion 114 and the parity portion 116. Also for example, the previous overall-decoding value 408 can correspond to all instances of the code words 112 of FIG. 1 in the transmission block 124 of FIG. 1.

The previous overall-decoding value 408 can contrast the previous inner-decoder value 352. The previous inner-decoder value 352 can correspond to the inner decoding process within one instance of the code words 112 or one instance of the transmission block 124, the information portion 114, or a combination thereof. For example, the previous inner-decoder value 352 can exclude correlations to the overall processing, all instances of the code words 112 across one or more instances of the transmission block 124, the parity portion 116, or a combination thereof.

The feedback adjustment 410 is a value for adjusting the decoding output 406 for processing the repeat data 146 of FIG. 1. The feedback adjustment 410 can be a value between and including 0 and 1. The feedback adjustment 410 can be used to determine the previous overall-decoding value 408.

The decoder inter-block module 318 can further determine the previous overall-decoding value 408 based on the accumulation output 358, the decoding a-priori value 404, the decoding output 406, the feedback adjustment 410, or a combination thereof. The decoder inter-block module 318 can further determine the previous overall-decoding value 408 using:

$$\Lambda_t - \alpha L_t.$$ Equation (16).

The term '$L_t$' can represent the accumulation output 358, the decoding a-priori value 404, or a combination thereof. The term '$\Lambda_t$' can represent the decoding output 406 and '$\alpha$' can represent the feedback adjustment 410.

The decoder inter-block module 318 can set the feedback adjustment 410. The decoder inter-block module 318 can set the feedback adjustment 410 to 0 for eliminating effects from the decoding a-priori value 404 in the previous overall-decoding value 408 and feeding back the a-posteriori value of the decoding module 306 using the previous overall-decoding value 408. The decoder inter-block module 318 can also set the feedback adjustment 410 to 1 for fully utilizing the decoding a-priori value 404 in the previous overall-decoding value 408 and feeding back the extrinsic value of the decoding module 306 using the previous overall-decoding value 408.

The decoder inter-block module 318 can further set the feedback adjustment 410 to a value between 0 and 1 for controlling the effect of the decoding a-priori value 404 in the previous overall-decoding value 408. The decoder inter-block module 318 can set the feedback adjustment 410 based on a variety of factors, such as the channel estimate 130 of FIG. 1, error rate, number of processing layer, transmission rate, the modulation scheme 120 of FIG. 1, or a combination thereof.

As described above, the feedback profile 360 can directly couple the accumulation output 358, the decoding a-priori value 404, the decoding output 406, or a combination thereof to the previous overall-decoding value 408. The feedback profile 360 can further directly couple a modification module 412 to the decoder inter-block module 318, the detection module 302, the adjustment module 304, or a combination thereof.

The modification module 412 is configured to puncture the previous overall-decoding value 408 for processing the repeat data 146. The puncturing process can be an inverse of the de-puncturing process described above. The modification module 412 can puncture the previous overall-decoding value 408 based on determining non-transmitted information, bits or symbols in the preceding data 144 that were not repeated in the repeat data 146.

The modification module 412 can further puncture the previous overall-decoding value 408 by setting the non-repeated bits or symbols to zero, setting the LLR values corresponding to the non-transmitted bits or symbols to zero, setting the LLR values to values corresponding to zero bit or specific symbol value, or a combination thereof. The modification module 412 can also puncture the previous overall-decoding value 408 by selecting a subset or a starting point for information repeated in the repeat data 146.

The punctured instance of the previous overall-decoding value 408 can be expressed as:

$$\Gamma_t = \Pi_1(\Lambda_{t-1} - \alpha L_{t-1}).\qquad\text{Equation (17).}$$

The punctured instance of the previous overall-decoding value 408 fed back for processing the repeat data 146 can be represented by '$\Gamma_t$'. The punctured and fed back instance of the previous overall-decoding value 408 can be based on the preceding data 144 as represented by 't−1'.

The modification module 412 can use the first communication unit 216 of FIG. 2, the second communication unit 236 of FIG. 2, the first control unit 212 of FIG. 2, the second control unit 234 of FIG. 2, or a combination thereof to perform the puncturing process. The modification module 412 can store the processing results in the first storage unit 224 of FIG. 2, the second storage unit 246 of FIG. 2, or a combination thereof.

The feedback profile 360 can feed back the punctured instance of the previous overall-decoding value 408 to the detection module 302, the adjustment module 304, or a combination thereof. The detection module 302 can be further configured to determine the detector output 314, such as the repeat detection result 356 of FIG. 3, corresponding to the repeat data 146 based on the previous overall-decoding value 408, the previous inner-decoder value 352, previous instance of the accumulation output 358, or a combination thereof. The detection module 302 can use the previous overall-decoding value 408 as an a-priori type of value for the detection module 302 for detecting the repeat data 146.

Similarly, the adjustment module 304 can be further configured to calculate a detector extrinsic value 414 based on the previous overall-decoding value 408, the detector output 314, or a combination thereof. The detector extrinsic value 414 is new information for the detection module 302, the adjustment module 304, or a combination thereof, not derived from received information thereto.

The adjustment module 304 can calculate the detector extrinsic value 414 using:

$$Y_t = X_t - \Gamma_t.\qquad\text{Equation (18).}$$

The term '$Y_t$' can represent the detector extrinsic value 414. The term '$X_t$' can represent the detector output 314, including the repeat detection result 356, and '$\Gamma_t$' can represent the previous overall-decoding value 408, or the punctured or derived instances thereof.

The adjustment module 304 can also directly calculate the detector extrinsic value 414 using:

$$Y_{t,k,n} = \log \Sigma_{\Theta \in S_n^1} G_n(r_{t,k}|\Theta,\Gamma_{t,k}) - \log \Sigma_{\Theta \in S_n^0} G_n(r_{t,k}|\Theta,\Gamma_{t,k}).\qquad\text{Equation (19).}$$

Equation (19) can be similar to Equation (2), with:

$$\log G_n(r_{t,k}|\Theta,\Gamma_{t,k}) = \frac{-\|r_{t,k}-a_{t,k}\Theta\|^2}{2\sigma_n^2} + \sum_{\substack{j=1 \\ j\neq n, S_j=1}}^{m} \Gamma_{t,k,j}.\qquad\text{Equation (20).}$$

The term '$Y_{t,k,n}$' can represent the extrinsic LLR value from the detection module 302 for the nth bit of the kth symbol after the tth transmission, and $\Gamma_{t,k} = [\Gamma_{t,k,1}, \ldots, \Gamma_{t,k,m}]$ can be the vector of $m = \log_2 M$ detector a priori LLR values corresponding to the kth symbol as determined from the preceding data 144. The adjustment module 304 can further use Equation (4) for approximations or lower complexity as described above.

The adjustment module 304 can further directly calculate the detector extrinsic value 414 for the multiple-input multiple-output scheme 134 of FIG. 1 using:

$$Y_{t,k,n}^d = \log \sum_{\xi \in \Psi_{n,d}^{(1)}} G_n^d(r_{t,k}|\xi,\Gamma_{t,k}) - \log \sum_{\xi \in \Psi_{n,d}^{(0)}} G_n^d(r_{t,k}|\xi,\Gamma_{t,k}).\qquad\text{Equation (21).}$$

Equation (21) can be similar to Equation (7), with:

$$\log G_n^d(r_{t,k}|\xi,\Gamma_{t,k}) = \\ \frac{-\|r_{t,k}-H_{t,k}\xi\|^2}{2\sigma_n^2} + \sum_{s=1}^{N_t} \sum_{\substack{j=1 \\ \xi(j,s)=1,(j,s)\neq(n,d)}}^{m} \Gamma_{t,k,j}^s.\qquad\text{Equation (22).}$$

The term '$Y_{t,k,n}^d$' can represent the extrinsic LLR value from the detection module 302 for the nth bit of the kth symbol in the dth stream or the communication layer 136 of FIG. 1 by using a-priori type of information for all $N_t$ streams generated for the preceding data 144. Also $\Gamma_{t,k} = [\Gamma_{t,k,1}^1, \ldots, \Gamma_{t,k,m}^1]$ and $\Gamma_{t,k}^d = [\Gamma_{t,k,1}^d, \ldots, \Gamma_{t,k,m}^d]$ can represent the detector a-priori type value at tth transmission corresponding to the mbits of the kth transmitted symbol x.

For illustrative purposes, the adjustment module 304 is described as calculating the detector extrinsic value 414. However, it is understood that the detection module 302 can calculate the detector extrinsic value 414 and the adjustment module 304 can perform the de-puncturing process as described in FIG. 3.

The adjustment module 304 can pass the detector extrinsic value 414 to the accumulator module 310 for determining the communication content 108 by combining the preceding data 144 and the repeat data 146. The accumulator module 310 can combine the detector extrinsic value 414 corresponding to the repeat data 146 with the stored instance of the detector output 314, such as the preceding detection result 354 of FIG. 3, corresponding to the preceding data 144 as described above.

The detection module 302 and the decoding module 306 can utilize the turbo-principle mechanism 348 of FIG. 3. The communication system 100 can implement the turbo-principle mechanism 348 by calculating the extrinsic values, interleaving or de-interleaving data, or a combination thereof based on an output value or the a-posteriori value with respect to the detection module 302 and the decoding module 306.

The communication system 100 can further implement the turbo-principle mechanism 348 by pairing the detection module 302 and the decoding module 306. The paired modules can be directly coupled to each other, such as being coupled without any intervening modules or circuitry other than conductors, for an iterative-detective-decoding (IDD) scheme 416. The paired modules can also be non-directly coupled to each other, such as by having one or more modules or circuitry there-between.

The iterative-detective-decoding scheme 416 is a method or process for determining the communication content 108 from the receiver signal 128 through repeated processing and interaction between the detection process and the decoding process. The iterative-detective-decoding scheme 416 can include a direct coupling between the detection module 302 and the decoding module 306, the detector output 314 and the decoding output 406, or a combination thereof.

The feedback profile 360 can be separate from the iterative-detective-decoding scheme 416. For example, the feedback profile 360 can include circuitry, connection, process step, or a combination thereof exclusive of the iterative-detective-decoding scheme 416, such as for separate processing sequences or parallel circuits.

The feedback profile 360 and the iterative-detective-decoding scheme 416 can also be integrated together, used simultaneously, or a combination thereof. For example, after receiving the receiver signal 128, several iterations of the detection and decoding can be deployed according to the iterative-detective-decoding scheme 416. The accumulation of extrinsic detector LLRs that will be used for the repeat data 146 as channel input to the decoder can be that of the last iteration for the iterative-detective-decoding scheme 416.

Also for example, the extrinsic value from the further decoder module 328 of FIG. 3, including the further-decoder extrinsic value 344 of FIG. 3, can be stored for the final iteration 324 of FIG. 3 for the decoding process of the last iteration for the iterative-detective-decoding scheme 416. The decoding output 406 can be the LLR values available after completion of decoding iterations in the last iteration for the iterative-detective-decoding scheme 416 of last transmission.

It has been discovered that the feedback profile 360 for providing the previous communication value 350 of FIG. 3 including the previous overall-decoding value 408 for the detection and adjustment process across instances of the transmission block 124 provides lower power consumption for the communication system 100. The use of the feedback profile 360 and the previous communication value 350 from the preceding data 144 for processing the repeat data 146 can increase throughput and coding gains with the same resources due to the increase in accuracy and continued relevant usage of prior processing results.

It has further been discovered that the previous overall-decoding value 408 determined using the decoding output 406 for the preceding data 144 and the feedback adjustment 410, and used for processing the repeat data 146 provides lower retransmission requests. The previous overall-decoding value 408 corresponding to the preceding data 144 used for processing the repeat data 146 can utilize the soft decision parameter to provide an accurate and relevant starting points in processing the repeat data 146.

It has also been discovered that the previous overall-decoding value 408, the detector extrinsic value 414, the decoding a-priori value 404, and the decoding output 406 provide lower error rates. The previous overall-decoding value 408, the detector extrinsic value 414, the decoding a-priori value 404, and the decoding output 406 can allow the communication system 100 to utilize the turbo-principle mechanism 348 both across and within instances of the transmission block 124, which can increase the accuracy of the detection and decoding processes overall.

It has also been discovered that feeding back the previous overall-decoding value 408 with the feedback profile 360 along with the iterative-detective-decoding scheme 416 based on the final iteration 324 of the decoding process and the last IDD iteration provides unexpected amount of increase in the throughput and coding gains. The combination of the feedback profile 360 for cross-transmission block processing with the iterative-detective-decoding scheme 416 can provide increase in the throughput rate exceeding the combined results from separately implementing the feedback profile 360 and the iterative-detective-decoding scheme 416.

For illustrative purposes, the communication system 100 has been described as determining the previous overall-decoding value 408 separate from determining the previous inner-decoder value 352. However, it is understood that the decoding module 306 and the previous communication value 350 can include both the previous overall-decoding value 408 and the previous inner-decoder value 352 and used in conjunction in processing the repeat data 146.

For example, the feedback profile 360 can include connections between the decoder inter-block module 318 and the base decoder module 326 for passing the previous inner-decoder value 352 to the base decoder module 326 along with the connections for providing the previous overall-decoding value 408 to the detection module 302, the adjustment module 304, or a combination thereof. Also for example, the decoder inter-block module 318 can pass the previous overall-decoding value 408 for the detection process and pass the previous inner-decoder value 352 to the decoding module 306 for the decoding process. For further example, the communication system 100 can have the feedback profile 360 as a combination of FIG. 3 and FIG. 4, further utilizing the iterative-detective-decoding scheme 416 along with the feedback profile 360.

It has been discovered that using both the previous overall-decoding value 408 and the previous inner-decoder value 352 across instances of the transmission block 124 for processing the repeat data 146 provides unexpected amount of increase in the throughput and coding gains. The performance gains from the previous overall-decoding value 408 and the previous inner-decoder value 352 can provide a compounding effect to provide increase in the throughput rate exceeding the combined results from separately implementing the previous overall-decoding value 408 and the previous inner-decoder value 352.

Figure 5:
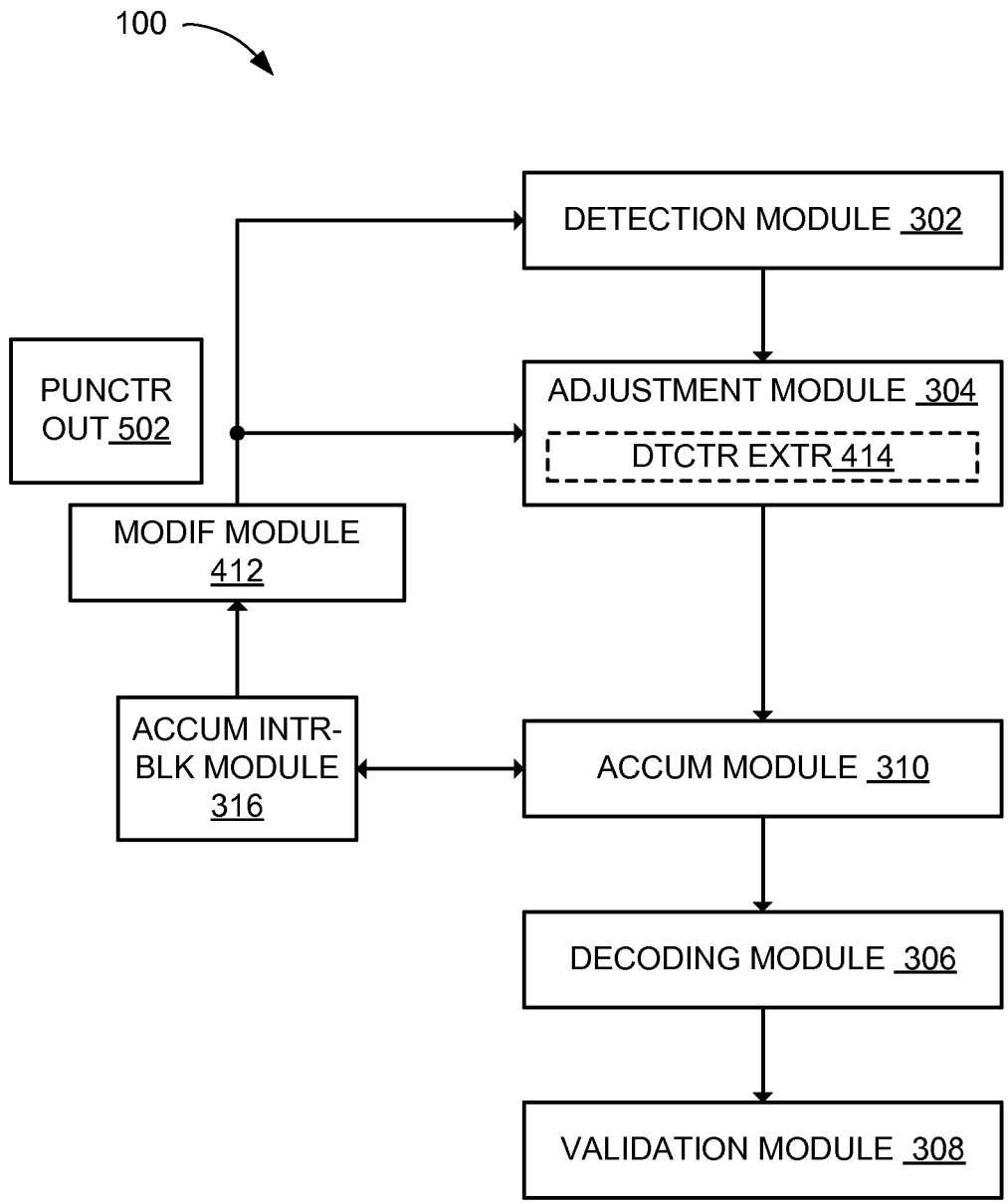
FIG. 5 is a further control flow of the communication system.

Referring now to FIG. 5, therein is shown a further control flow of the communication system 100. The communication system 100 can include a different instance of the feedback profile 360 of FIG. 3. The different instance of the feedback profile 360 can represent a different exemplary embodiment or a different example of a control flow for the previous discussed exemplary embodiment for the communication system 100.

The detection module 302, the adjustment module 304, the accumulator module 310, the decoding module 306, and the validation module 308 can process the preceding data 144 of FIG. 1 similarly as described above. The feedback profile 360 of FIG. 3 can include a coupling, such as a direct connection or a non-direct connection as described above, between the accumulator inter-block module 316 and the modification module 412. The feedback profile 360 can further include a coupling, such as direct or indirect, between the modification module 412 and the detection module 302, the adjustment module 304, or a combination thereof.

During processing for the preceding data 144, the accumulator inter-block module 316 can store the preceding data 144, the preceding detection result 354 of FIG. 3, a derivation thereof, or a combination thereof. The accumulator module 310 can pass the preceding data 144, the preceding detection result 354, a derivation thereof, or a combination thereof to the modification module 412 for processing the repeat data 146 of FIG. 3. The accumulator module 310 can pass the stored information based on receiving the repeat data 146.

The modification module 412 can be configured to generate a puncturing output 502 according to the repeat data 146 through adjusting based on the preceding data 144, the preceding detection result 354, the previous overall-decoding value 408 of FIG. 4, the accumulation output 358 of FIG. 3, or a combination thereof. The puncturing output 502 can be used for combining the preceding data 144 with the repeat data 146, such as by combining the puncturing output 502, the repeat detection result 356 of FIG. 3, the accumulation output 358, or a combination thereof with the accumulator module 310. The modification module 412 can generate the puncturing output 502 by puncturing the preceding data 144, the preceding detection result 354, or a combination thereof as described above.

The puncturing output 502 can be represented as:

$$\Gamma_t = \Pi_1(L_{t-1}).$$  Equation (23).

For the multiple-input multiple-output scheme 134 of FIG. 1, the puncturing output 502 can be represented as:

$$\Gamma_t^d = \Pi_1(L_{t-1}^d).$$  Equation (24).

For example, the puncturing output 502 can be based on the decoding a-priori value 404 of FIG. 4, such as the preceding data 144, the preceding detection result 354, the accumulation output 358, or a combination thereof. As a more specific example, the puncturing output 502 can be a punctured instance of the decoding a-priori value 404. Also for example, the puncturing output 502 can be based on the decoding a-priori value 404 and the feedback adjustment 410 of FIG. 4, similar to the previous overall-decoding value 408 described above.

The detection module 302 can be configured to detect the repeat data 146 based on the previous communication value 350 of FIG. 3 from a previously occurring instance of the transmission block 124 of FIG. 1. The detection module 302 can detect the repeat data 146 by generating the repeat detection result 356 based on the puncturing output 502 corresponding to the processing results for the preceding data 144. The detection module 302 can generate the repeat detection result 356 similarly as described above for using the previous overall-decoding value 408.

Similarly, the adjustment module 304 can de-puncture the detector output 314 of FIG. 3, calculate the detector extrinsic value 414 of FIG. 4, or a combination thereof as described above. For example, the adjustment module 304 can calculate the detector extrinsic value 414 using Equation (18). Also for example, the term '$\Gamma_t$' can represent the puncturing output 502 from the modification module 412.

The accumulator module 310 can be configured to combine the repeat data 146 and the preceding data 144. The accumulator module 310 can combine across instances of the transmission block 124 based on the detector extrinsic value 414. The accumulator module 310 can combine the puncturing output 502 and the repeat detection result 356, for combining the repeat data 146 and the preceding data 144.

The accumulator module 310 can combine the puncturing output 502 and the repeat detection result 356, as represented by:

$$L_t = \Sigma_{j=1}^t \Pi_1^{-1}(Y_j) = L_{t-1} + \Pi_1^{-1}(Y_t).$$  Equation (25).

For the multiple-input multiple-output scheme 134, the combining process can be represented by:

$$L_t^d = \Sigma_{j=1}^t \Pi_1^{-1}(Y_j^d) = L_{t-1}^d + \Pi_1^{-1}(Y_t^d).$$  Equation (26).

The term '$L_t$' can represent the accumulation output 358 or the decoding a-priori value 404. The 't−1' term can represent association with or basis of the data as the preceding data 144.

It has been discovered that the feedback profile 360 for providing the puncturing output 502 for the detection and adjustment process across instances of the transmission block 124 provides lower power consumption for the communication system 100. The use of the feedback profile 360 and the puncturing output 502 from the preceding data 144 for processing the repeat data 146 can increase throughput and coding gains with the same resources due to the increase in accuracy and continued relevant usage of prior processing results.

It has also been discovered that the puncturing output 502 determined based on the decoding a-priori value 404 for the preceding data 144, such as the preceding data 144, the preceding detection result 354, the accumulation output 358, or a combination thereof, and used for processing the repeat data 146 provides lower retransmission requests. The puncturing output 502 can utilize the soft decision parameter to provide accurate and relevant starting points in processing the repeat data 146.

It has further been discovered that the puncturing output 502 based on the preceding data 144 and used for processing the repeat data 146 provides unexpected amount of increase in the throughput and coding gains without increasing the hardware requirements. The puncturing output 502 can capture and utilize extra decoder extrinsic information based on the accumulation output 358, the detector output 314, a derivative thereof, or a combination thereof corresponding to the preceding data 144, which is already required for the accumulation process.

For illustrative purposes, the communication system 100 has been described as determining the puncturing output 502 based on the decoding a-priori value 404, separate from determining the previous inner-decoder value 352 of FIG. 3. However, it is understood that the communication system 100 can utilize both the decoding a-priori value 404 and the previous inner-decoder value 352.

For example, the feedback profile 360 can include connections between the decoder inter-block module 318 and the base decoder module 326 for passing the previous inner-decoder value 352 to the base decoder module 326 along with the connections for determining and providing the puncturing output 502 to the detection module 302, the adjustment module 304, or a combination thereof. Also for example, the accumulator inter-block module 316 and the modification module 412 can determine and pass the puncturing output 502 for the detection process, and the decoder inter-block module 318 can pass the previous inner-decoder value 352 to the decoding module 306 for the decoding process. For further example, the communication system 100 can have the feedback profile 360 as a combination of FIG. 3 and FIG. 5, further utilizing the iterative-detective-decoding scheme 416 of FIG. 4 along with the feedback profile 360.

It has been discovered that using both the puncturing output 502 and the previous inner-decoder value 352 across instances of the transmission block 124 for processing the repeat data 146 provides unexpected amount of increase in the throughput and coding gains. The performance gains from the puncturing output 502 can provide a compounding effect when implemented with the previous inner-decoder value 352, which can provide an increase in the throughput rate exceeding a combination from separately implementing the previous overall-decoding value 408 and the previous inner-decoder value 352.

Figure 6:
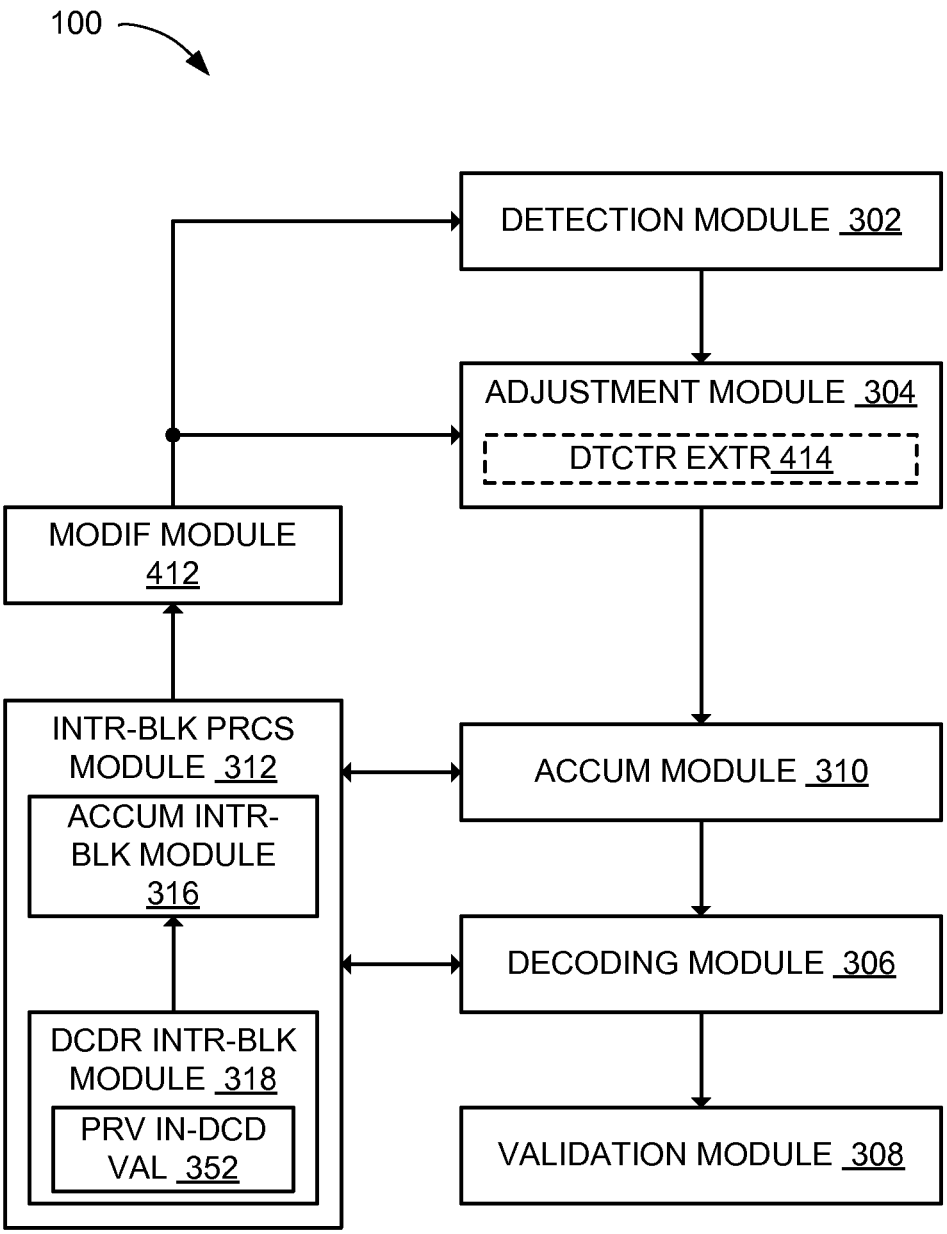
FIG. 6 is a further control flow of the communication system.

Referring now to FIG. 6, therein is shown a further control flow of the communication system 100. The communication system 100 can include a different instance of the feedback profile 360 of FIG. 3. The different instance of the feedback profile 360 can represent a different exemplary embodiment or a different example of a control flow for the previous discussed exemplary embodiment for the communication system 100.

The detection module 302, the adjustment module 304, the accumulator module 310, the decoding module 306, and the validation module 308 can process the preceding data 144 of FIG. 1 similarly as described above. The communication system 100 shown in FIG. 6 can be similar to a combination of FIG. 3 and FIG. 5 except for interaction between the accumulator inter-block module 316 and the decoder inter-block module 318. The feedback profile 360 can include a direct or non-direct coupling, as described above, for the accumulator inter-block module 316 and the decoder inter-block module 318.

The feedback profile 360 can have the decoder inter-block module 318 provide output from extrinsic values from the further decoder module 328 of FIG. 3 to the accumulator inter-block module 316. The accumulator inter-block module 316 can determine the puncturing output 502 of FIG. 5 based on the previous inner-decoder value 352 of FIG. 3. The accumulator inter-block module 316 can combine the decoding a-priori value 404 of FIG. 4 and the previous inner-decoder value 352 based on the further-decoder extrinsic value 344 of FIG. 3 for determining the puncturing output 502.

The puncturing output 502 can be expressed as:

$$\Gamma_t(s)=\Pi_1(L_{t-1}(s)+L_{e,2,t-1}^{I_m}).$$ Equation (27).

For the multiple-input multiple-output scheme 134 of FIG. 1, the puncturing output 502 can be expressed as:

$$\Gamma_t^d(s)=\Pi_1(L_{t-1}^d(s)+\Pi_2^{-1}(\epsilon_{t-1}^d(2,I))),$$

$$\Gamma_t^d(p)=\Pi_1(L_{t-1}^d(p)).$$ Equation (28).

The puncturing output 502 '$\Gamma_t^d$', can include both the systematic part '$\Gamma_t^d(s)$' and the redundant parity part '$\Gamma_t^d(p)$'. The term '$L_{e,2,t-1}^{I_m}$' and '$L_{t-1}^d(s)$' can represent the previous inner-decoder value 352 corresponding to the further-decoder extrinsic value 344 on the final iteration 324 of FIG. 3 for processing the preceding data 144.

It has been discovered that the puncturing output 502 determined using the previous inner-decoder value 352 provides unexpected amount of increase in the throughput and coding gains. The performance gains from the previous inner-decoder value 352 can be amplified during determination of the puncturing output 502, which can provide more accurate detector probabilities for the systematic bits at the next transmission. The performance gains exceed a sum for the separate implementations of the puncturing output 502 and the previous inner-decoder value 352.

The modules described in this application can be hardware implementation or hardware accelerators, including passive circuitry, active circuitry, or both, in the first control unit 216 of FIG. 2 or in the second control unit 238 of FIG. 2. The modules can also be hardware implementation or hardware accelerators, including passive circuitry, active circuitry, or both, within the mobile device 102 of FIG. 1 or the base station 106 of FIG. 1 but outside of the first control unit 216 or the second control unit 238, respectively.

The physical transformation from the receiver signal 128 of FIG. 1 through changes in the detector output 314 of FIG. 3, the accumulation output 358 of FIG. 3, the previous communication value or a combination thereof from the preceding data 144 for processing the received data results in the movement in the physical world, such as content displayed or recreated for the user on the mobile device 102. The content, such as navigation information or voice signal of a caller, recreated on the mobile device 102 can influence the user's movement, such as following the navigation information or replying back to the caller. Movement in the physical world results in changes to the transmitter channel 126 of FIG. 1, which can be fed back into the communication system 100 to process the receiver signal 128 for communicating the communication content 108 of FIG. 1.

Figure 7:
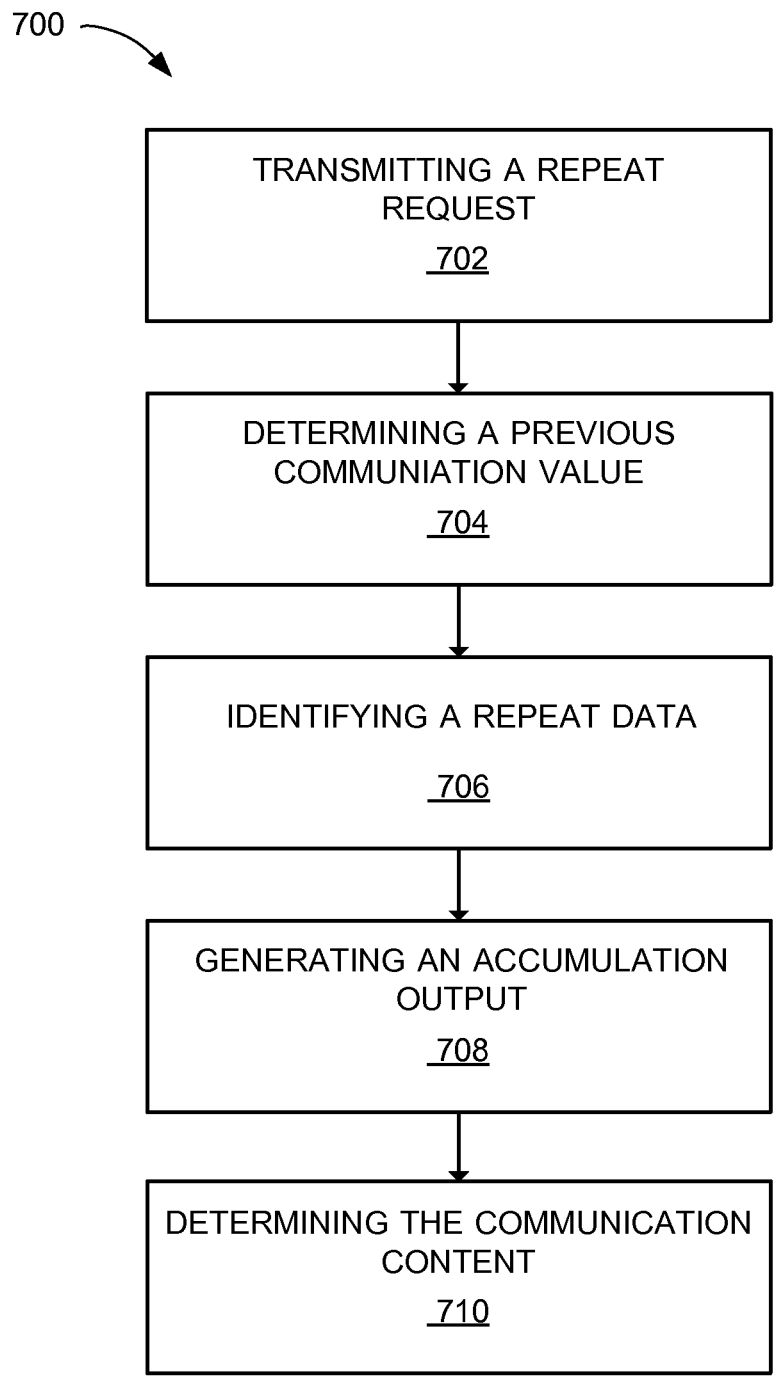
FIG. 7 is a flow chart of a method of operation of a communication system in an embodiment of the present invention.

Referring now to FIG. 7, therein is shown a flow chart of a method 700 of operation of a communication system 100 in an embodiment of the present invention. The method 700 includes: transmitting a repeat request corresponding to a preceding data including a communication content in a block 702; determining a previous communication value with a control unit based on the preceding data in a block 704; identifying a repeat data corresponding to the repeat request from a receiver signal in a block 706; generating an accumulation output based on the preceding data and the repeat data in a block 708; and determining the communication content using the previous communication value and the accumulation output across instances of a transmission block for communicating with a device in a block 710.

It has been discovered that the previous communication value 350 of FIG. 3, including the previous inner-decoder value 352 of FIG. 3 or the previous overall-decoding value 408 of FIG. 4, the puncturing output 502 of FIG. 5 based on the decoding a-priori value 404 of FIG. 4 or the previous communication value 350, the preceding data 144 of FIG. 1, or a combination thereof, provide increase in communication speed, reduction of decoding cycles, lower power consumption, lower retransmission requests, and lower error rates. It has also been discovered that the previous communication value, the puncturing output, the feedback profile 360 of FIG. 3, or a combination thereof provide other unexpected gain in throughput and coding.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A requesting device of a communication system comprising:
   an antenna configured to:
      receive preceding data including a communication content corresponding to an instance of a transmission block;
      transmit a repeat request corresponding to an error detection status for the preceding data;
      receive a receiver signal corresponding to a further instance of the transmission block subsequent to the repeat request;
   a control unit, coupled to the antenna, configured to:
      determine a previous communication value resulting from decoding the preceding data for generating the error detection status of the preceding data;
      identify a repeat data corresponding to the repeat request from the receiver signal;
      generate an accumulation output including systematic channel log-likelihood ratios (LLRs), subsequent to de-interleaving the receiver signal and de-puncturing the repeat data, based on combining the preceding data and the repeat data, and a repeat detection result and a preceding detection result; and
      determine the communication content based on decoding the accumulation output using the previous communication value and the accumulation output.

2. The system as claimed in claim 1 wherein the control unit is configured to:
   generate a previous inner-decoder value based on a further-decoder extrinsic value corresponding to the preceding data; and
   determine a base-decoder a-priori value corresponding to the repeat data based on the previous inner-decoder value.

3. The system as claimed in claim 1 wherein the control unit is configured to:
   calculate a decoding output corresponding to the preceding data;
   determine a previous overall-decoding value based on the decoding output; and
   calculate a detector extrinsic value corresponding to the repeat data based on the previous overall-decoding value for determining the communication content by combining the preceding data and the repeat data.

4. The system as claimed in claim 1 wherein the control unit is configured to:
   calculate a decoding output corresponding to the preceding data;
   determine a previous overall-decoding value based on the decoding output; and
   determine a detector output corresponding to the repeat data based on the previous overall-decoding value.

5. The system as claimed in claim 1 wherein the control unit is configured to:
   generate the preceding detection result based on receiving the preceding data and the repeat detection result corresponding to the repeat data; and
   generate a puncturing output based on the preceding detection result for combining the puncturing output and the repeat detection result with an accumulator module.

6. The system as claimed in claim 1 wherein the control unit is configured to generate the repeat detection result based on the preceding detection result corresponding to receiving the preceding data.

7. The system as claimed in claim 1 wherein the control unit is configured to:
   generate the preceding detection result based on receiving the preceding data;
   calculate a decoding output corresponding to the preceding data;
   determine a previous overall-decoding value based on the decoding output; and
   generate a puncturing output based on the preceding detection result and the previous overall- decoding value for combining the puncturing output and the repeat detection result with an accumulator module.

8. The system as claimed in claim 1 wherein the control unit is configured to:
   generate the preceding detection result based on receiving the preceding data and to generate the repeat detection result for the repeat data based on the preceding detection result and a previous overall-decoding value;
   calculate a decoding output corresponding to the preceding data; and
   determine the previous overall-decoding value based on the decoding output for generating the repeat detection result.

9. The system as claimed in claim 1 wherein the control unit is configured to determine the communication content for a single-input single-output scheme, a multiple-input multiple-output scheme, or a combination thereof.

10. The system as claimed in claim 1 wherein the control unit is configured to determine the communication content using an iterative-detective-decoding scheme.

11. A method of operation of a requesting device in a communication system comprising:
   receiving preceding data including a communication content corresponding to an instance of a transmission block;
   transmitting a repeat request corresponding to an error detection status for the preceding data;
   receiving a receiver signal corresponding to a further instance of the transmission block subsequent to the repeat request;
   determining with a control unit a previous communication value resulting from decoding the preceding data for generating the error detection status of the preceding data;
   identifying a repeat data corresponding to the repeat request from the receiver signal;
   generating an accumulation output including systematic channel log-likelihood ratios (LLRs), subsequent to de-interleaving the receiver signal and de-puncturing the repeat data, based on combining the preceding data and the repeat data, and a repeat detection result and a preceding detection result; and determining the communication content based on decoding the accumulation output using the previous communication value and the accumulation output.

12. The method as claimed in claim 11 wherein:
determining the previous communication value includes generating a previous inner-decoder value based on a further-decoder extrinsic value corresponding to the preceding data; and
determining the communication content includes determining a base-decoder a-priori value corresponding to the repeat data based on the previous inner-decoder value.

13. The method as claimed in claim 11 wherein:
determining the previous communication value includes:
calculating a decoding output corresponding to the preceding data, determining a previous overall-decoding value based on the decoding output; and
further comprising:
calculating a detector extrinsic value corresponding to the repeat data based on the previous overall-decoding value for determining the communication content by combining the preceding data and the repeat data.

14. The method as claimed in claim 11 wherein:
determining the previous communication value includes:
calculating a decoding output corresponding to the preceding data,
determining a previous overall-decoding value based on the decoding output; and
identifying the repeat data includes determining a detector output corresponding to the repeat data based on the previous overall-decoding value.

15. The method as claimed in claim 11 further comprising:
generating the preceding detection result based on receiving the preceding data;
wherein:
identifying the repeat data includes generating the repeat detection result corresponding to the repeat data;
generating the accumulation output includes:
generating a puncturing output based on the preceding detection result, and combining the puncturing output and the repeat detection result.

16. The method as claimed in claim 11 further comprising:
generating the preceding detection result based on receiving the preceding data; and
wherein:
identifying the repeat data includes generating the repeat detection result based on the preceding detection result.

17. The method as claimed in claim 11 further comprising:
generating the preceding detection result based on receiving the preceding data;
wherein:
determining the previous communication value includes:
calculating a decoding output corresponding to the preceding data,
determining a previous overall-decoding value based on the decoding output;
generating the accumulation output includes:
generating a puncturing output based on the preceding detection result and the previous overall-decoding value, and
combining the puncturing output and the repeat detection result.

18. The method as claimed in claim 11 further comprising:
generating the preceding detection result based on receiving the preceding data;
wherein:
determining the previous communication value includes:
calculating a decoding output corresponding to the preceding data,
determining a previous overall-decoding value based on the decoding output; and
identifying the repeat data includes generating the repeat detection result for the repeat data based on the preceding detection result and the previous overall-decoding value.

19. The method as claimed in claim 11 wherein determining the communication content includes determining the communication content for a single-input single-output scheme, a multiple-input multiple-output scheme, or a combination thereof.

20. The method as claimed in claim 11 wherein determining the communication content includes determining the communication content using an iterative-detective-decoding scheme.

* * * * *